United States Patent
Li et al.

(10) Patent No.: US 10,945,268 B2
(45) Date of Patent: *Mar. 9, 2021

(54) UE INITIATED BEAM MANAGEMENT PROCEDURE

(71) Applicant: Apple Inc., Cupertino, CA (US)

(72) Inventors: Yang Li, Plano, TX (US); Haitong Sun, Irvine, CA (US); Zhu Ji, San Jose, CA (US); Yuchul Kim, Santa Clara, CA (US); Beibei Wang, Cupertino, CA (US); Wei Zhang, Santa Clara, CA (US); Wei Zeng, San Diego, CA (US); Jia Tang, San Jose, CA (US); Tianyan Pu, Cupertino, CA (US); Sami M. Almalfouh, San Jose, CA (US); Johnson O. Sebeni, Fremont, CA (US); Dawei Zhang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/749,553

(22) Filed: Jan. 22, 2020

(65) Prior Publication Data

US 2020/0163073 A1    May 21, 2020

Related U.S. Application Data

(63) Continuation of application No. 16/145,411, filed on Sep. 28, 2018, now Pat. No. 10,582,503.

(Continued)

(51) Int. Cl.
*H04B 7/02* (2018.01)
*H04W 72/04* (2009.01)
(Continued)

(52) U.S. Cl.
CPC ........ *H04W 72/046* (2013.01); *H04B 7/0695* (2013.01); *H04B 7/088* (2013.01); *H04W 24/10* (2013.01); *H04W 72/0413* (2013.01)

(58) Field of Classification Search
CPC ............... H04W 72/046; H04W 24/10; H04W 72/0413; H04B 7/088; H04B 7/0695
(Continued)

(56) References Cited

U.S. PATENT DOCUMENTS 10,582,503 B2 *   3/2020  Li ...................... H04W 72/046
2017/0207843 A1   7/2017  Jung
(Continued)

FOREIGN PATENT DOCUMENTS

WO   WO 2018/129300 A1   7/2018
WO   WO 2018183991 A1   10/2018

OTHER PUBLICATIONS

Written Opinion, Application No. PCT/US2018/058901, dated Sep. 20, 2019, seven pages.

(Continued)

*Primary Examiner* — Don N Vo
(74) *Attorney, Agent, or Firm* — Kowert, Hood, Munyon, Rankin & Goetzel, P.C.

(57) ABSTRACT

Apparatuses, systems, and methods for a wireless device to perform user equipment (UE) initiated beam management procedures with a base station or gNB. A wireless device in communication with a 5G base station may detect degradation in the pair of transmit and receive beams between the gNB and the device. The device may select a preferred beam management procedure and indicate the preference to the gNB.

20 Claims, 15 Drawing Sheets

Related U.S. Application Data

(60) Provisional application No. 62/586,747, filed on Nov. 15, 2017, provisional application No. 62/584,668, filed on Nov. 10, 2017.

(51) Int. Cl.
*H04B 7/06* (2006.01)
*H04B 7/08* (2006.01)
*H04W 24/10* (2009.01)

(58) Field of Classification Search
USPC .................................. 375/224, 260, 267
See application file for complete search history.

(56) References Cited

U.S. PATENT DOCUMENTS

| | | | |
|---|---|---|---|
| 2018/0123650 A1 | 5/2018 | Yu | |
| 2018/0138962 A1 | 5/2018 | Islam | |
| 2018/0191422 A1 | 7/2018 | Xia | |
| 2018/0255607 A1* | 9/2018 | Nagaraja | H04W 76/28 |
| 2018/0278319 A1 | 9/2018 | Cezanne | |
| 2019/0053072 A1 | 2/2019 | Kundargi | |
| 2019/0090143 A1 | 3/2019 | Luo | |
| 2019/0313397 A1* | 10/2019 | Chen | H04B 7/0632 |
| 2019/0341992 A1* | 11/2019 | Zhou | H04B 7/0617 |
| 2020/0059397 A1* | 2/2020 | da Silva | H04B 7/0619 |
| 2020/0107327 A1* | 4/2020 | Wang | H04B 7/0695 |
| 2020/0186211 A1* | 6/2020 | Islam | H04B 7/0404 |

OTHER PUBLICATIONS

Intel Corporation; "Details for DL Beam Management"; 3GPP Draft; R1-1710526; 3rd Generation Partnership Project (3GPP), Mobile Competence Centre; 650, Route Des Lucioles ; F-06921 Sophia-Antipolis Cedex; France, vol. RAN WG1, No. Qingdao, China; Jun. 26, 2017; XP051299733; 13 pages.

Ericsson; "On UE initiated beam recovery", 3GPP Draft; R1-1700765; 3rd Generation Partnership Project (3GPP), Mobile Competence Centre; 650, Route Des Lucioles; F-06921 Sophia-Antipolis Cedex; France, vol. RAN WG1, No. Spokane, WA, USA; Jan. 16, 2017; XP051208289; 2 pages.

Invitation to Pay Additional Fees, Application No. PCT/US2018/058901, dated Feb. 14, 2018, 11 pages.

* cited by examiner

| 4 Bit-field | Implications |
|---|---|
| Bit 0 | UE Prefers P2 |
| Bit 1 | UE Prefers P3 |
| Bit 2 | UE Prefers U2 |
| Bit 3 | UE Prefers U3 |

FIG. 11A

| 2 Bit-field | Implications |
|---|---|
| "00" | UE Prefers P2 |
| "01" | UE Prefers P3 |
| "10" | UE Prefers U2 |
| "11" | UE Prefers U3 |

FIG. 11B

Additional Bit-field for TCI

| 2 Bit-field | Implications |
|---|---|
| "00" | TCI 0 |
| "01" | TCI 1 |
| "10" | TCI 2 |
| "11" | TCI 3 |

FIG. 11C

Joint Bit-field

| 2 Bit-field | Implications | |
|---|---|---|
| "00" | UE Prefers P2 | TCI 0 |
| "01" | UE Prefers P3 | TCI 1 |
| "10" | UE Prefers U2 | TCI 2 |
| "11" | UE Prefers U3 | TCI 3 |

FIG. 11D

| Parameter Name | Description | Range |
|---|---|---|
| Nzc | Length of ZC Sequence | [1, ∞] |
| u | Index of ZC Sequence | [1, Nzc-1] |
| v | Random Access preamble Cyclic Shifts, in Unit of Ncs | [1, Nzc] |
| Ncs | Cyclic Shifts of ZC Sequence | [1, 15] |

*FIG. 12*

| 2 Bit-field | Implications Output | Measurement Input |
|---|---|---|
| 1st Bit | UE Prefers P2 | UE tries broad beam or multiple directions yet signal strength is still below a certain threshold (Or: UE detects a new path present from different angle) |
| 2nd Bit | UE Prefers P3 | Serving beam strength drops (Note: UE detects its rotating may also apply here) |

*FIG. 13*

| # or Rx Beams (X) | N | Time and Resource required for Sequential Rx Beam Search: 2^N | Time and Resource required for Hierarchal Rx Beam Search: 2*N |
|---|---|---|---|
| 2 | 1 | 2 | 2 |
| 4 | 2 | 4 | 4 |
| 8 | 3 | 8 | 6 |
| 16 | 4 | 16 | 8 |
| 32 | 5 | 32 | 10 |
| 64 | 6 | 64 | 12 |

FIG. 17

UE INITIATED BEAM MANAGEMENT PROCEDURE

PRIORITY CLAIM

This application is a continuation of U.S. patent application Ser. No. 16/145,411, entitled "UE Initiated Beam Management Procedure," filed Sep. 28, 2018, which claims priority to U.S. provisional patent application Ser. No. 62/586,747, entitled "UE Initiated Beam Management Procedure," filed Nov. 15, 2017, and also claims priority to U.S. provisional patent application Ser. No. 62/584,668, entitled "UE Initiated Beam Management Procedure," filed Nov. 10, 2017, each of which is hereby incorporated by reference in its entirety as though fully and completely set forth herein.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, any disclaimer made in the instant application should not be read into or against the parent application or other related applications.

FIELD

The present application relates to wireless devices, and more particularly to apparatus, systems, and methods for a wireless device to initiate beam management procedures for next generation radio access technologies.

DESCRIPTION OF THE RELATED ART

Wireless communication systems are rapidly growing in usage. Further, wireless communication technology has evolved from voice-only communications to also include the transmission of data, such as Internet and multimedia content. Thus, improvements in the field are desired.

SUMMARY

Embodiments relate to apparatuses, systems, and methods to perform beam management procedures of a wireless device and a next generation network node (e.g., a fifth generation new radio (5G NR) network node also called a gNB). A wireless device may establish communication with the gNB and may receive an indication of a transmission (Tx) beam used by the gNB. The wireless device may determine at least one reception (Rx) beam based on the indication of the Tx beam. The wireless device may detect an opportunity for beam improvement based on radio measurements and/or other sensors (e.g., indicating motion of the device). The device may select a beam management procedure, and possibly additional related parameters, and provide an indication of the selection to the gNB.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of various embodiments is considered in conjunction with the following drawings, in which:

FIGS. 11A-11D illustrate exemplary PUCCH formats, according to some embodiments;

FIG. 12 illustrates exemplary RACH preambles, according to some embodiments;

FIG. 13 illustrates exemplary mapping techniques, according to some embodiments; and FIGS. 14-17 illustrate Rx beam sweeping techniques, according to some embodiments.

Figure 1:
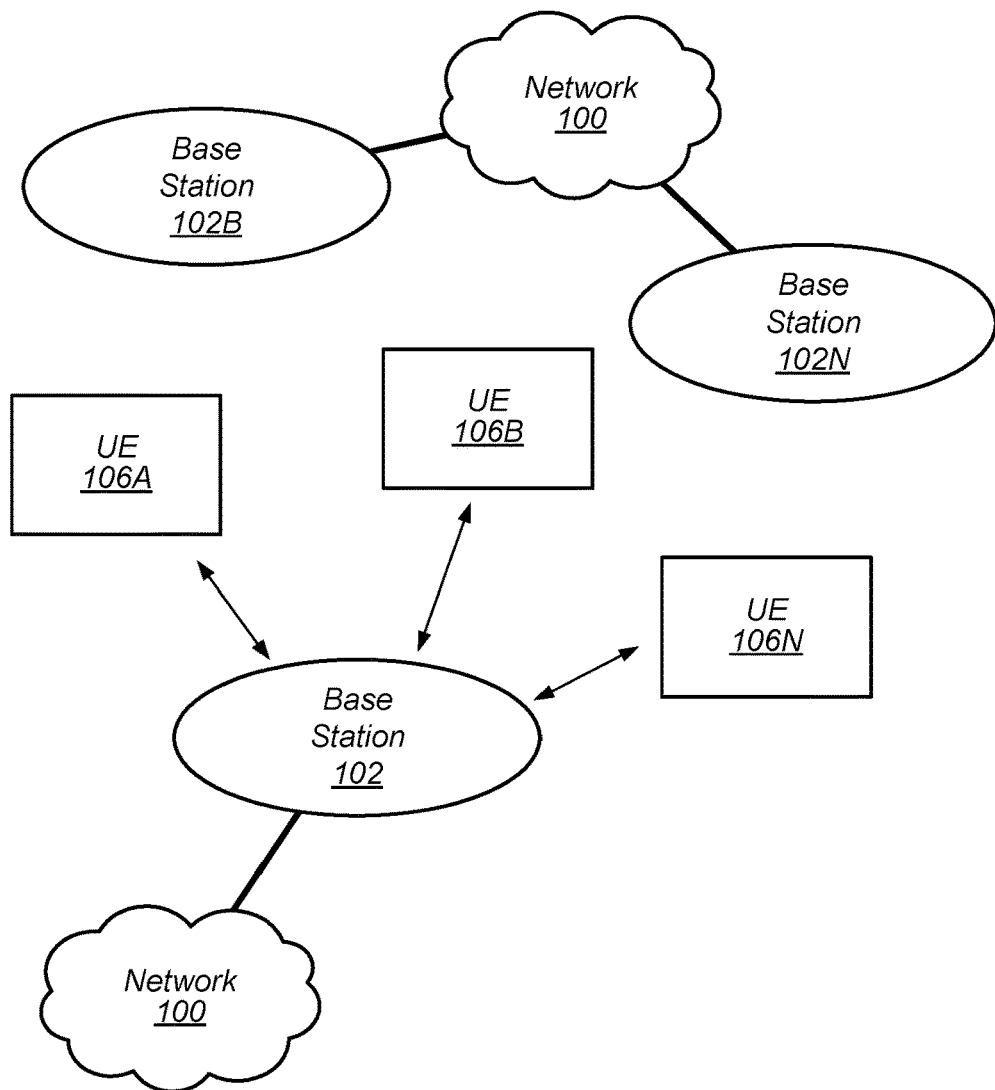
FIG. 1 illustrates an example wireless communication system, according to some embodiments.

While the features described herein may be susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION

Terms

The following is a glossary of terms used in this disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, Play Station Portable™, Gameboy Advance™, iPhone™), laptops, wearable devices (e.g. smart watch, smart glasses), PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Wireless Device—any of various types of computer system devices which performs wireless communications. A wireless device can be portable (or mobile) or may be stationary or fixed at a certain location. A UE is an example of a wireless device.

Communication Device—any of various types of computer systems or devices that perform communications, where the communications can be wired or wireless. A communication device can be portable (or mobile) or may be stationary or fixed at a certain location. A wireless device is an example of a communication device. A UE is another example of a communication device.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing a function in a device, such as a user equipment or a cellular network device. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Approximately—refers to a value that is almost correct or exact. For example, approximately may refer to a value that is within 1 to 10 percent of the exact (or desired) value. It should be noted, however, that the actual threshold value (or tolerance) may be application dependent. For example, in some embodiments, "approximately" may mean within 0.1% of some specified or desired value, while in various other embodiments, the threshold may be, for example, 2%, 3%, 5%, and so forth, as desired or as required by the particular application.

Concurrent—refers to parallel execution or performance, where tasks, processes, or programs are performed in an at least partially overlapping manner. For example, concurrency may be implemented using "strong" or strict parallelism, where tasks are performed (at least partially) in parallel on respective computational elements, or using "weak parallelism", where the tasks are performed in an interleaved manner, e.g., by time multiplexing of execution threads.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112(f) interpretation for that component.

Acronyms
BM: beam management
QCL: quasi-colocation
DCI: downlink control information
TCI: transmission configuration indicator
CSI: channel state information
RS: reference signal
P-CSI-RS: Periodic CSI-RS
SP-CSI-RS: Semi-persistent CSI-RS
SSB: Synchronisation Signal Blocks
SRS: Sound Reference Signal Resource Set
CRS: CSI-RS Resource Set
CORESET: Control Resource Set FIGS. 1 and 2—Communication System FIG. 1 illustrates a simplified example wireless communication system, according to some embodiments. It is noted that the system of FIG. 1 is merely one example of a possible system, and that features of this disclosure may be implemented in any of various systems, as desired.

As shown, the example wireless communication system includes a base station 102 which communicates over a transmission medium with one or more user devices 106A, 106B, etc., through 106N. Each of the user devices may be referred to herein as a "user equipment" (UE). Thus, the user devices 106 are referred to as UEs or UE devices.

The base station (BS) 102 may be a base transceiver station (BTS) or cell site (a "cellular base station"), and may include hardware that enables wireless communication with the UEs 106A through 106N.

The communication area (or coverage area) of the base station may be referred to as a "cell." The base station 102 and the UEs 106 may be configured to communicate over the transmission medium using any of various radio access technologies (RATs), also referred to as wireless communication technologies, or telecommunication standards, such as GSM, UMTS (associated with, for example, WCDMA or TD-SCDMA air interfaces), LTE, LTE-Advanced (LTE-A), 5G new radio (5G NR), HSPA, 3GPP2 CDMA2000 (e.g., 1×RTT, 1×EV-DO, HRPD, eHRPD), etc. Note that if the base station 102 is implemented in the context of LTE, it may alternately be referred to as an 'eNodeB' or 'eNB'. Note that if the base station 102 is implemented in the context of 5G NR, it may alternately be referred to as 'gNodeB' or 'gNB'.

As shown, the base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. In particular, the cellular base station 102 may provide UEs 106 with various telecommunication capabilities, such as voice, SMS and/or data services.

Base station 102 and other similar base stations operating according to the same or a different cellular communication standard may thus be provided as a network of cells, which may provide continuous or nearly continuous overlapping service to UEs 106A-N and similar devices over a geographic area via one or more cellular communication standards.

Thus, while base station 102 may act as a "serving cell" for UEs 106A-N as illustrated in FIG. 1, each UE 106 may also be capable of receiving signals from (and possibly within communication range of) one or more other cells (which might be provided by other base stations 102B-N), which may be referred to as "neighboring cells". Such cells may also be capable of facilitating communication between user devices and/or between user devices and the network 100. Such cells may include "macro" cells, "micro" cells, "pico" cells, and/or cells which provide any of various other granularities of service area size. Other configurations are also possible.

In some embodiments, base station 102 may be a next generation base station, e.g., a 5G New Radio (5G NR) base station, or "gNB". In some embodiments, a gNB may be connected to a legacy evolved packet core (EPC) network and/or to a NR core (NRC) network. In addition, a gNB cell may include one or more transition and reception points (TRPs). In addition, a UE capable of operating according to 5G NR may be connected to one or more TRPs within one or more gNBs.

Note that a UE 106 may be capable of communicating using multiple wireless communication standards. For example, the UE 106 may be configured to communicate using a wireless networking (e.g., Wi-Fi) and/or peer-to-peer wireless communication protocol (e.g., Bluetooth, Wi-Fi peer-to-peer, etc.) in addition to at least one cellular communication protocol (e.g., GSM, UMTS (associated with, for example, WCDMA or TD-SCDMA air interfaces), LTE, LTE-A, 5G NR, HSPA, 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H), and/or any other wireless communication protocol, if desired. Other combinations of wireless communication standards (including more than two wireless communication standards) are also possible.

Figure 2:
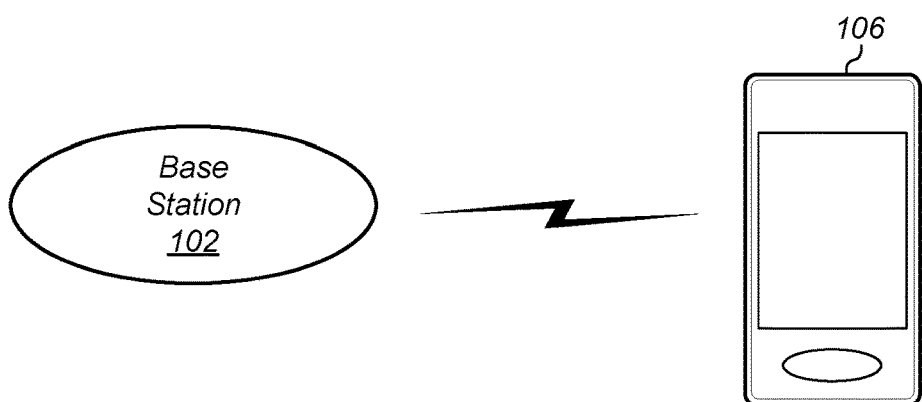
FIG. 2 illustrates a base station (BS) in communication with a user equipment (UE) device, according to some embodiments.

FIG. 2 illustrates user equipment 106 (e.g., one of the devices 106A through 106N) in communication with a base station 102, according to some embodiments. The UE 106 may be a device with cellular communication capability such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may include one or more antennas for communicating using one or more wireless communication protocols or technologies. In some embodiments, the UE 106 may be configured to communicate using, for example, CDMA2000 (1×RTT/1×EV-DO/HRPD/eHRPD) or LTE using a single shared radio and/or GSM or LTE using the single shared radio. The shared radio may couple to a single antenna, or may couple to multiple antennas (e.g., for multiple-input, multiple-output or "MIMO") for performing wireless communications. In general, a radio may include any combination of a baseband processor, analog RF signal processing circuitry (e.g., including filters, mixers, oscillators, amplifiers, etc.), or digital processing circuitry (e.g., for digital modulation as well as other digital processing). Similarly, the radio may implement one or more receive and transmit chains using the aforementioned hardware. For example, the UE 106 may share one or more parts of a receive and/or transmit chain between multiple wireless communication technologies, such as those discussed above.

In some embodiments, the UE 106 may include any number of antennas and may be configured to use the antennas to transmit and/or receive directional wireless signals (e.g., beams). Similarly, the BS 102 may also include any number of antennas and may be configured to use the antennas to transmit and/or receive directional wireless signals (e.g., beams).

In some embodiments, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using either of LTE or 5G NR (or LTE or 1×RTT or LTE or GSM), and separate radios for communicating using each of Wi-Fi and Bluetooth. Other configurations are also possible.

Figure 3:
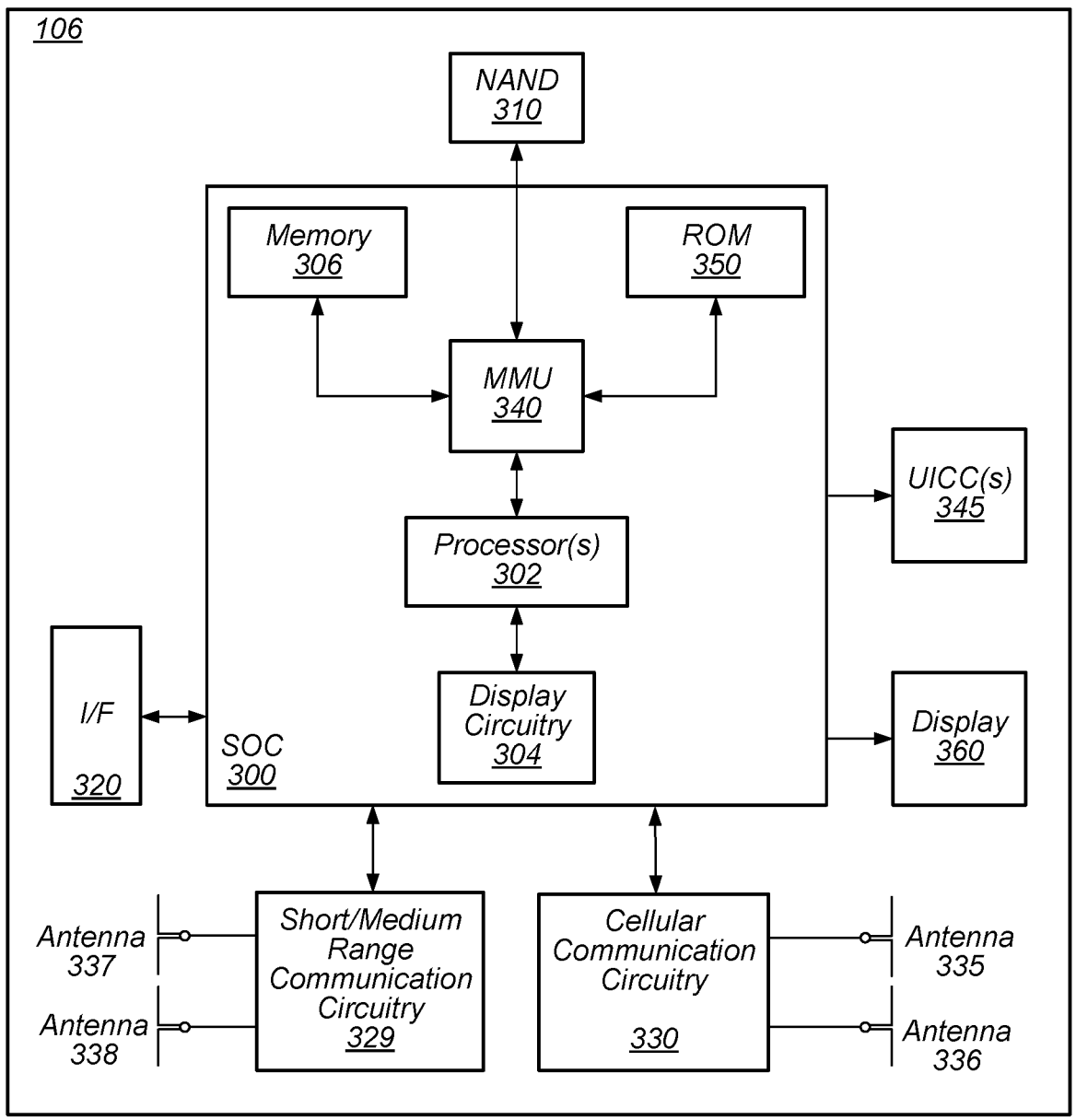
FIG. 3 illustrates an example block diagram of a UE, according to some embodiments.

FIG. 3—Block Diagram of a UE

FIG. 3 illustrates an example simplified block diagram of a communication device 106, according to some embodiments. It is noted that the block diagram of the communication device of FIG. 3 is only one example of a possible communication device. According to embodiments, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices. As shown, the communication device 106 may include a set of components 300 configured to perform core functions. For example, this set of components may be implemented as a system on chip (SOC), which may include portions for various purposes. Alternatively, this set of components 300 may be implemented as separate components or groups of components for the various purposes. The set of components 300 may be coupled (e.g., communicatively; directly or indirectly) to various other circuits of the communication device 106.

For example, the communication device 106 may include various types of memory (e.g., including NAND flash 310), an input/output interface such as connector I/F 320 (e.g., for connecting to a computer system; dock; charging station; input devices, such as a microphone, camera, keyboard; output devices, such as speakers; etc.), the display 360, which may be integrated with or external to the communication device 106, and cellular communication circuitry 330 such as for 5G NR, LTE, GSM, etc., and short to medium range wireless communication circuitry 329 (e.g., Bluetooth™ and WLAN circuitry). In some embodiments, communication device 106 may include wired communication circuitry (not shown), such as a network interface card, e.g., for Ethernet.

The cellular communication circuitry 330 may couple (e.g., communicatively; directly or indirectly) to one or more antennas, such as antennas 335 and 336 as shown. The short to medium range wireless communication circuitry 329 may also couple (e.g., communicatively; directly or indirectly) to one or more antennas, such as antennas 337 and 338 as shown. Alternatively, the short to medium range wireless communication circuitry 329 may couple (e.g., communicatively; directly or indirectly) to the antennas 335 and 336 in addition to, or instead of, coupling (e.g., communicatively; directly or indirectly) to the antennas 337 and 338. The short to medium range wireless communication circuitry 329 and/or cellular communication circuitry 330 may include multiple receive chains and/or multiple transmit chains for receiving and/or transmitting multiple spatial streams, such as in a multiple-input multiple output (MIMO) configuration.

In some embodiments, as further described below, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). In addition, in some embodiments, cellular communication circuitry 330 may include a single transmit chain that may be switched between radios dedicated to specific RATs. For example, a first radio may be dedicated to a first RAT, e.g., LTE, and may be in communication with a dedicated receive chain and a transmit chain shared with an additional radio, e.g., a second radio that may be dedicated to a second RAT, e.g., 5G NR, and may be in communication with a dedicated receive chain and the shared transmit chain.

The communication device 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving or interpreting user input.

The communication device 106 may further include one or more smart cards 345 that include SIM (Subscriber Identity Module) functionality, such as one or more UICC(s) (Universal Integrated Circuit Card(s)) cards 345.

As shown, the SOC 300 may include processor(s) 302, which may execute program instructions for the communication device 106 and display circuitry 304, which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, short range wireless communication circuitry 229, cellular communication circuitry 330, connector I/F 320, and/or display 360. The MMU 340 may be configured to perform memory protection and page table translation or set up. In some embodiments, the MMU 340 may be included as a portion of the processor(s) 302.

As noted above, the communication device 106 may be configured to communicate using wireless and/or wired communication circuitry. The communication device 106 may be configured to transmit a request to attach to a first network node operating according to the first RAT and transmit an indication that the wireless device is capable of maintaining substantially concurrent connections with the first network node and a second network node that operates according to the second RAT. The wireless device may also be configured transmit a request to attach to the second network node. The request may include an indication that the wireless device is capable of maintaining substantially concurrent connections with the first and second network nodes. Further, the wireless device may be configured to receive an indication that dual connectivity with the first and second network nodes has been established.

As described herein, the communication device 106 may include hardware and software components for implementing features for using RRC multiplexing to perform transmissions according to multiple radio access technologies in the same frequency carrier, as well as the various other techniques described herein. The processor 302 of the communication device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the communication device 106, in conjunction with one or more of the other components 300, 304, 306, 310, 320, 329, 330, 340, 345, 350, 360 may be configured to implement part or all of the features described herein.

In addition, as described herein, processor 302 may include one or more processing elements. Thus, processor 302 may include one or more integrated circuits (ICs) that are configured to perform the functions of processor 302. In addition, each integrated circuit may include circuitry (e.g., first circuitry, second circuitry, etc.) configured to perform the functions of processor(s) 302.

Further, as described herein, cellular communication circuitry 330 and short range wireless communication circuitry 329 may each include one or more processing elements. In other words, one or more processing elements may be included in cellular communication circuitry 330 and, similarly, one or more processing elements may be included in short range wireless communication circuitry 329. Thus, cellular communication circuitry 330 may include one or more integrated circuits (ICs) that are configured to perform the functions of cellular communication circuitry 330. In addition, each integrated circuit may include circuitry (e.g., first circuitry, second circuitry, etc.) configured to perform the functions of cellular communication circuitry 230. Similarly, the short range wireless communication circuitry 329 may include one or more ICs that are configured to perform the functions of short range wireless communication circuitry 32. In addition, each integrated circuit may include circuitry (e.g., first circuitry, second circuitry, etc.) configured to perform the functions of short range wireless communication circuitry 329.

Figure 4:
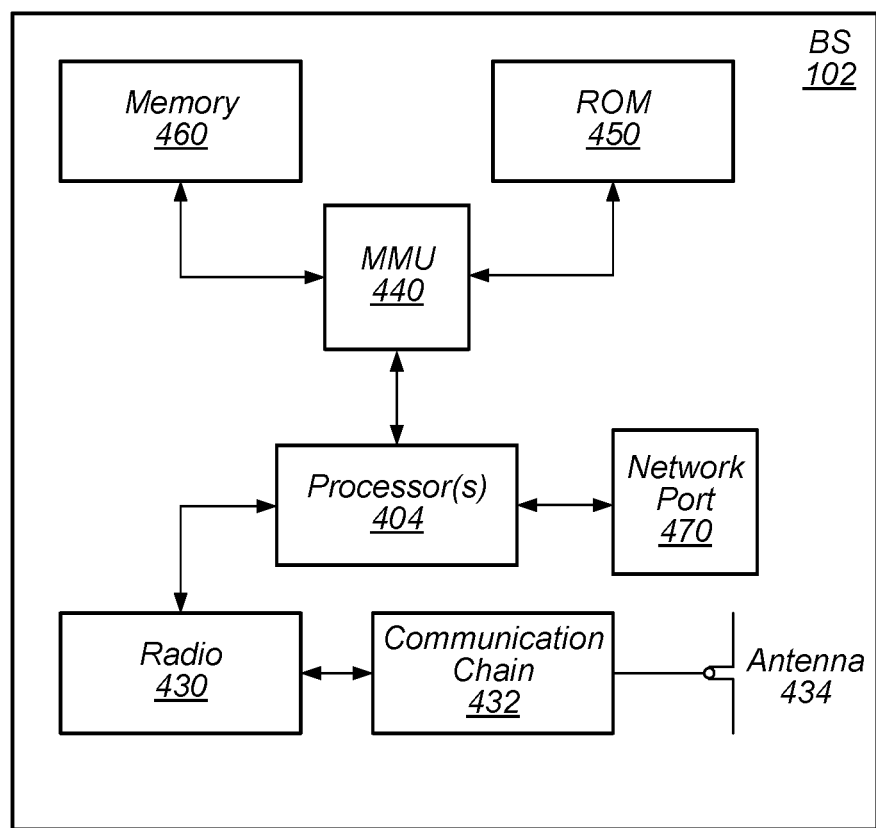
FIG. 4 illustrates an example block diagram of a BS, according to some embodiments.

FIG. 4—Block Diagram of a Base Station

FIG. 4 illustrates an example block diagram of a base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

In some embodiments, base station 102 may be a next generation base station, e.g., a 5G New Radio (5G NR) base station, or "gNB". In such embodiments, base station 102 may be connected to a legacy evolved packet core (EPC) network and/or to a NR core (NRC) network. In addition, base station 102 may be considered a 5G NR cell and may include one or more transition and reception points (TRPs). In addition, a UE capable of operating according to 5G NR may be connected to one or more TRPs within one or more gNBs.

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless communication standards, including, but not limited to, 5G NR, LTE, LTE-A, GSM, UMTS, CDMA2000, Wi-Fi, etc.

The base station 102 may be configured to communicate wirelessly using multiple wireless communication standards. In some instances, the base station 102 may include multiple radios, which may enable the base station 102 to communicate according to multiple wireless communication technologies. For example, as one possibility, the base station 102 may include an LTE radio for performing communication according to LTE as well as a 5G NR radio for performing communication according to 5G NR. In such a case, the base station 102 may be capable of operating as both an LTE base station and a 5G NR base station. As another possibility, the base station 102 may include a multi-mode radio which is capable of performing communications according to any of multiple wireless communication technologies (e.g., 5G NR and Wi-Fi, LTE and Wi-Fi, LTE and UMTS, LTE and CDMA2000, UMTS and GSM, etc.).

As described further subsequently herein, the BS 102 may include hardware and software components for implementing or supporting implementation of features described herein. The processor 404 of the base station 102 may be configured to implement or support implementation of part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof. Alternatively (or in addition) the processor 404 of the BS 102, in conjunction with one or more of the other components 430, 432, 434, 440, 450, 460, 470 may be configured to implement or support implementation of part or all of the features described herein.

In addition, as described herein, processor(s) 404 may include one or more processing elements. Thus, processor(s) 404 may include one or more integrated circuits (ICs) that are configured to perform the functions of processor(s) 404. In addition, each integrated circuit may include circuitry (e.g., first circuitry, second circuitry, etc.) configured to perform the functions of processor(s) 404.

Further, as described herein, radio 430 may include one or more processing elements. Thus, radio 430 may include one or more integrated circuits (ICs) that are configured to perform the functions of radio 430. In addition, each integrated circuit may include circuitry (e.g., first circuitry, second circuitry, etc.) configured to perform the functions of radio 430.

Figure 5:
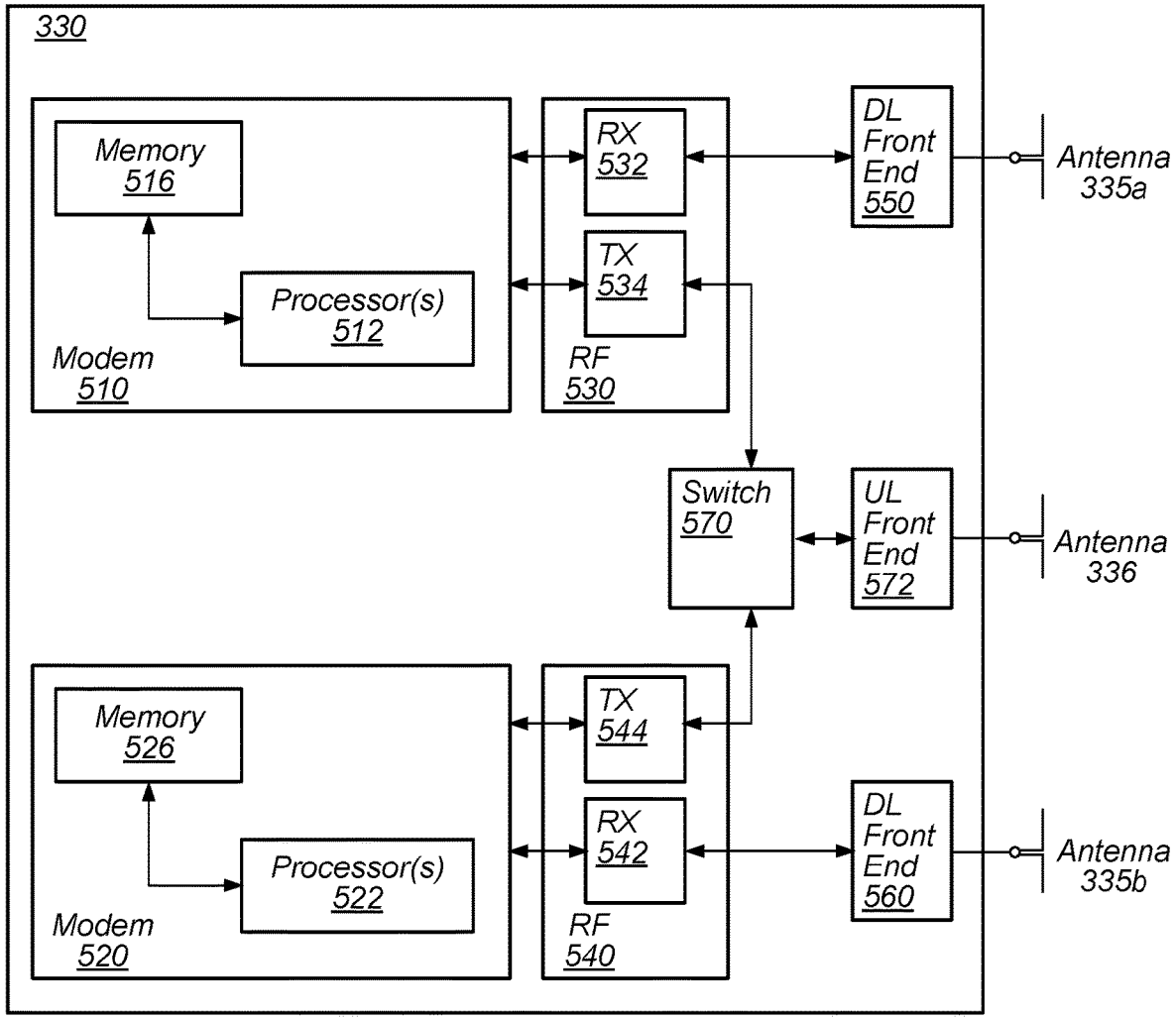
FIG. 5 illustrates an example block diagram of cellular communication circuitry, according to some embodiments.

FIG. 5—Block Diagram of Cellular Communication Circuitry

FIG. 5 illustrates an example simplified block diagram of cellular communication circuitry, according to some embodiments. It is noted that the block diagram of the cellular communication circuitry of FIG. 5 is only one example of a possible cellular communication circuit; other circuits, such as circuits including or coupled to sufficient antennas for different RATs to perform uplink activities using separate antennas, are also possible. According to embodiments, cellular communication circuitry 330 may be included in a communication device, such as communication device 106 described above. As noted above, communication device 106 may be a user equipment (UE) device, a mobile device or mobile station, a wireless device or wireless station, a desktop computer or computing device, a mobile computing device (e.g., a laptop, notebook, or portable computing device), a tablet and/or a combination of devices, among other devices.

The cellular communication circuitry 330 may couple (e.g., communicatively; directly or indirectly) to one or more antennas, such as antennas 335*a-b* and 336 as shown (in FIG. 3). In some embodiments, cellular communication circuitry 330 may include dedicated receive chains (including and/or coupled to, e.g., communicatively; directly or indirectly. dedicated processors and/or radios) for multiple RATs (e.g., a first receive chain for LTE and a second receive chain for 5G NR). For example, as shown in FIG. 5, cellular communication circuitry 330 may include a modem 510 and a modem 520. Modem 510 may be configured for communications according to a first RAT, e.g., such as LTE or LTE-A, and modem 520 may be configured for communications according to a second RAT, e.g., such as 5G NR.

As shown, modem 510 may include one or more processors 512 and a memory 516 in communication with processors 512. Modem 510 may be in communication with a radio frequency (RF) front end 530. RF front end 530 may include circuitry for transmitting and receiving radio signals. For example, RF front end 530 may include receive circuitry (RX) 532 and transmit circuitry (TX) 534. In some embodiments, receive circuitry 532 may be in communication with downlink (DL) front end 550, which may include circuitry for receiving radio signals via antenna 335*a*.

Similarly, modem 520 may include one or more processors 522 and a memory 526 in communication with processors 522. Modem 520 may be in communication with an RF front end 540. RF front end 540 may include circuitry for transmitting and receiving radio signals. For example, RF front end 540 may include receive circuitry 542 and transmit circuitry 544. In some embodiments, receive circuitry 542 may be in communication with DL front end 560, which may include circuitry for receiving radio signals via antenna 335*b*.

In some embodiments, a switch 570 may couple transmit circuitry 534 to uplink (UL) front end 572. In addition, switch 570 may couple transmit circuitry 544 to UL front end 572. UL front end 572 may include circuitry for transmitting radio signals via antenna 336. Thus, when cellular communication circuitry 330 receives instructions to transmit according to the first RAT (e.g., as supported via modem 510), switch 570 may be switched to a first state that allows modem 510 to transmit signals according to the first RAT (e.g., via a transmit chain that includes transmit circuitry 534 and UL front end 572). Similarly, when cellular communication circuitry 330 receives instructions to transmit according to the second RAT (e.g., as supported via modem 520), switch 570 may be switched to a second state that allows modem 520 to transmit signals according to the second RAT (e.g., via a transmit chain that includes transmit circuitry 544 and UL front end 572).

In some embodiments, the cellular communication circuitry 330 may be configured to transmit, via the first modem while the switch is in the first state, a request to attach to a first network node operating according to the first RAT and transmit, via the first modem while the switch is in a first state, an indication that the wireless device is capable of maintaining substantially concurrent connections with the first network node and a second network node that operates according to the second RAT. The wireless device may also be configured transmit, via the second radio while the switch is in a second state, a request to attach to the second network node. The request may include an indication that the wireless device is capable of maintaining substantially concurrent connections with the first and second network nodes. Further, the wireless device may be configured to receive, via the first radio, an indication that dual connectivity with the first and second network nodes has been established.

As described herein, the modem 510 may include hardware and software components for implementing features for using RRC multiplexing to perform transmissions according to multiple radio access technologies in the same frequency carrier, as well as the various other techniques described herein. The processors 512 may be configured to implement part or all of the features described herein, e.g., by executing program instructions stored on a memory medium (e.g., a non-transitory computer-readable memory medium). Alternatively (or in addition), processor 512 may be configured as a programmable hardware element, such as an FPGA (Field Programmable Gate Array), or as an ASIC (Application Specific Integrated Circuit). Alternatively (or in addition) the processor 512, in conjunction with one or more of the other components 530, 532, 534, 550, 570, 572, 335 and 336 may be configured to implement part or all of the features described herein.

In addition, as described herein, processors 512 may include one or more processing elements. Thus, processors 512 may include one or more integrated circuits (ICs) that are configured to perform the functions of processors 512. In addition, each integrated circuit may include circuitry (e.g., first circuitry, second circuitry, etc.) configured to perform the functions of processors 512.

As described herein, the modem 520 may include hardware and software components for implementing features for using RRC multiplexing to perform transmissions according to multiple radio access technologies in the same frequency carrier, as well as the various other techniques described herein. The processors 522 may be configured to implement part or all of the features described herein, e.g., by executing program instructions stored on a memory medium (e.g., a non-transitory computer-readable memory medium). Alternatively (or in addition), processor 522 may be configured as a programmable hardware element, such as an FPGA (Field Programmable Gate Array), or as an ASIC (Application Specific Integrated Circuit). Alternatively (or in addition) the processor 522, in conjunction with one or more of the other components 540, 542, 544, 550, 570, 572, 335 and 336 may be configured to implement part or all of the features described herein.

In addition, as described herein, processors 522 may include one or more processing elements. Thus, processors 522 may include one or more integrated circuits (ICs) that are configured to perform the functions of processors 522. In addition, each integrated circuit may include circuitry (e.g., first circuitry, second circuitry, etc.) configured to perform the functions of processors 522.

Figure 6A:
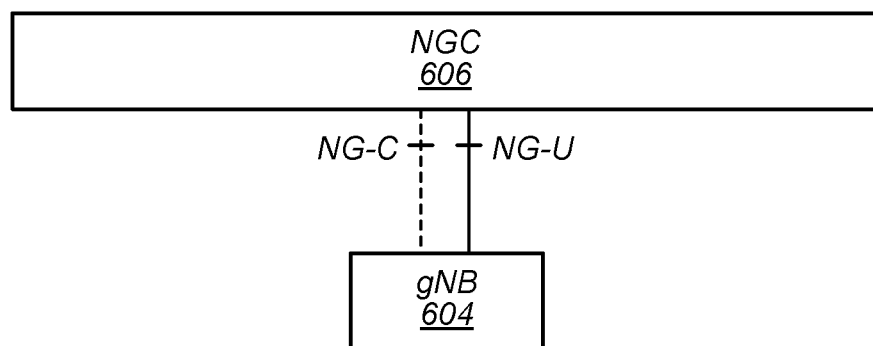
FIGS. 6A and 6B illustrate examples of a 5G NR base station (gNB), according to some embodiments.
Figure 6B:
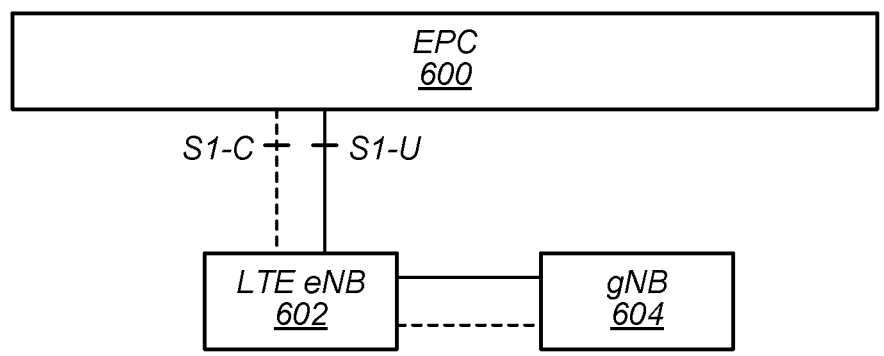

FIGS. 6A-6B—5G NR Architecture

In some implementations, fifth generation (5G) wireless communication will initially be deployed concurrently with other wireless communication standards (e.g., LTE). For example, whereas FIG. 6A illustrates a possible standalone (SA) implementation of a next generation core (NGC) network 606 and 5G NR base station (e.g., gNB 604), dual connectivity between LTE and 5G new radio (5G NR or NR), such as in accordance with the exemplary non-standalone (NSA) architecture illustrated in FIG. 6B, has been specified as part of the initial deployment of NR. Thus, as illustrated in FIG. 6B, evolved packet core (EPC) network 600 may continue to communicate with current LTE base stations (e.g., eNB 602). In addition, eNB 602 may be in communication with a 5G NR base station (e.g., gNB 604) and may pass data between the EPC network 600 and gNB 604. In some instances, the gNB 604 may also have at least a user plane reference point with EPC network 600. Thus, EPC network 600 may be used (or reused) and gNB 604 may serve as extra capacity for UEs, e.g., for providing increased downlink throughput to UEs. In other words, LTE may be used for control plane signaling and NR may be used for user plane signaling. Thus, LTE may be used to establish connections to the network and NR may be used for data services. As will be appreciated, numerous other non-standalone architecture variants are possible.

Figure 7:
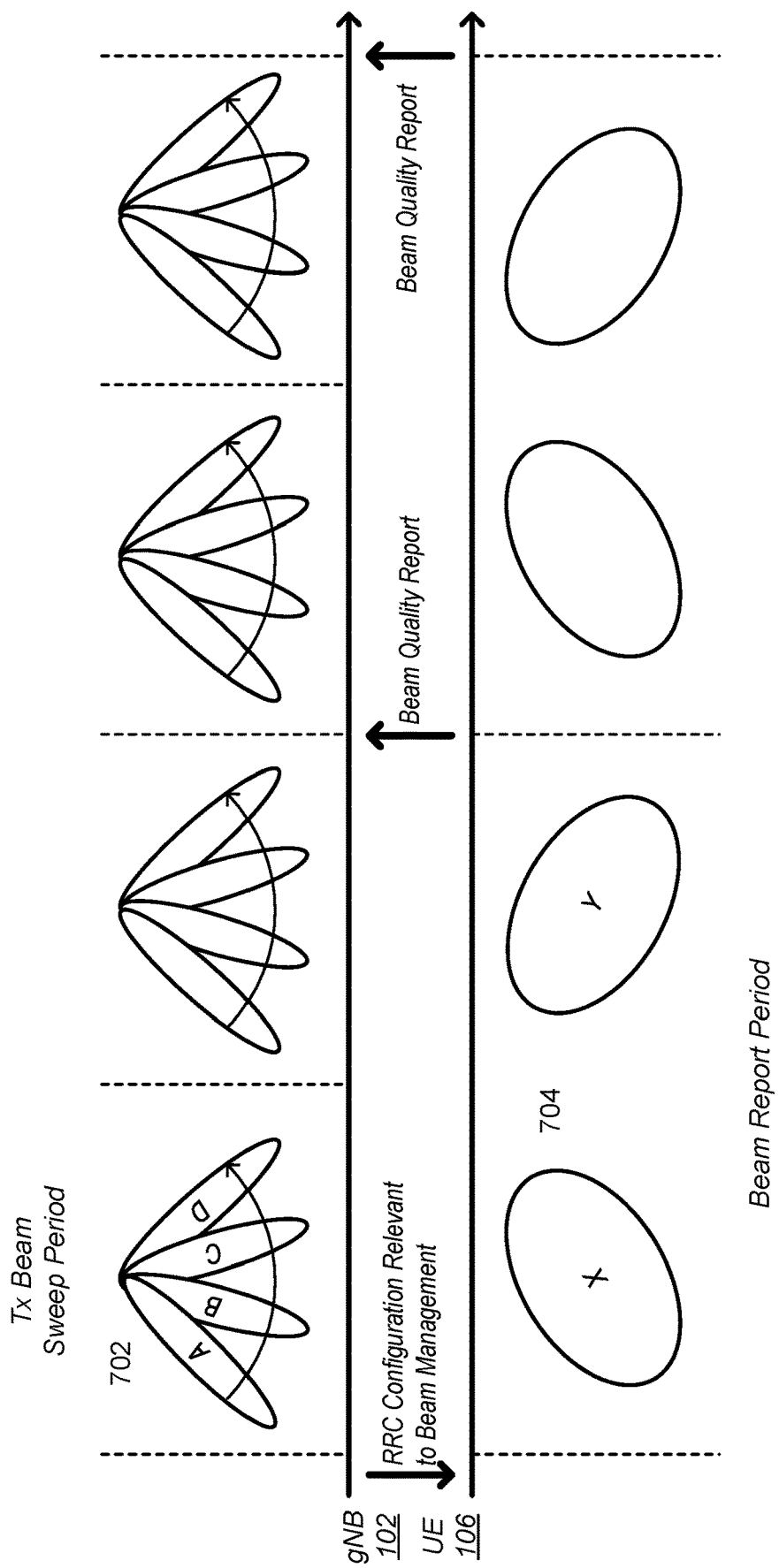
FIG. 7 illustrates beam management procedures, according to some embodiments.
Figure 8:
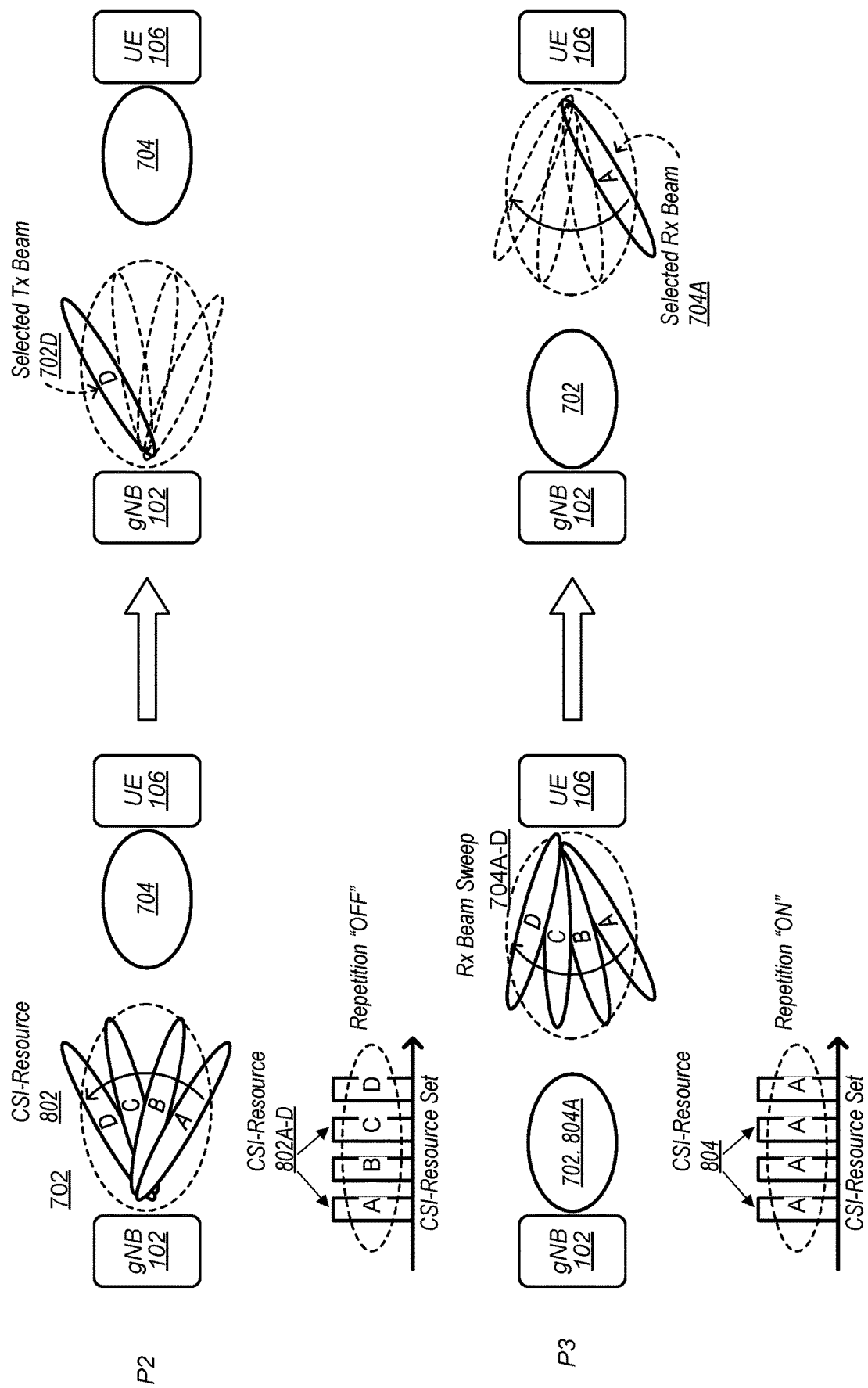
FIG. 8 illustrates beam management procedures P2 and P3, according to some embodiments.

FIGS. 7 and 8—Beam Management (BM)

One aspect of 5G may be beam forming and beam management (BM). Beam forming and beam management may include various techniques for creating directional beams for transmitting (Tx) and receiving (Rx) wireless signals. A 5G device (e.g., UE 106 and/or BS 102) may use multiple antennas to create such beams. In order to create a communication channel between a pair of wireless devices, the devices may select respective Tx and Rx beams so that the transmitting device's Tx beam points toward (e.g., aligns with) the receiving device's Rx beam. BM may be thought of as the process to select and maintain appropriate Tx and Rx beam selection to create a quality communication channel (e.g., as measured according to one or more of various metrics of signal strength and quality such as RSRP, RSRQ, SINR, SNR, CQI, etc.). Various factors of the communication environment may impact beam selection, e.g., position and orientation of the devices relative to obstacles (e.g., buildings), sources of interference, etc. These factors may change over time (e.g., due to motion of the UE, among other reasons) and thus the preferred Rx and or Tx beams may also change. Note that both devices may both transmit and receive, and thus may use both Tx and Rx beams.

BM frameworks may operate as shown in FIG. 7. A BS 102 (e.g., a gNB 102, e.g., shown as the transmitting device, in this example) may periodically or routinely transmit BM channel state information (CSI). BM CSI may include reference signals (e.g., P-CSI-RS: Periodic CSI-RS, SP-CSI-RS: Semi-persistent CSI-RS, SSB: Synchronization Signal Blocks, etc.). The gNB may also periodically transmit RRC configuration information that may be relevant to BM. The UE may monitor/measure the RSRP of the beam(s) and may report the RSRP to the gNB (e.g., in a beam quality report). The gNB may monitor beam degradation (e.g., or any change in beam quality), e.g., based on the reported RSRP. Note that additional or alternative measurements may also be taken, reported and used such as RSRQ, SNR, etc. Based on detecting beam degradation (e.g., due to CSI and/or one or more metrics in the beam quality report passing or falling below a threshold), the gNB may trigger BM procedures. In some embodiments, aperiodic BM procedures (such as P2/P3, discussed below) may be triggered by a gNB if BM CSI is not sufficient to avoid degradation (e.g., beyond a threshold). Such aperiodic BM procedures may be UE-specific, e.g., in order to avoid the potentially extensive resource cost of doing so for UEs generally.

As illustrated, during an exemplary BM procedure, a BS 102 (e.g., a gNB) may transmit a series of beams (e.g., Tx beams 702A, B, C, and D) in a sweep (or a series of sweeps) and may transmit RRC configuration information relevant to beam management. As used herein, the term "sweep" may indicate sequentially using each of multiple beams. UE 106 may detect one or more of the beams, may measure the strength (e.g., RSRP) or other characteristics of the beam(s), and may provide one or more reports to the gNB based on the detection(s) and/or measurement(s). During the sweep, the UE may use one or more Rx beams (in the illustrated example, the UE uses two different Rx beams 704X and Y). One or more beam sweep periods (e.g., the length of time to transmit Tx beams 702A-D) may occur during a beam report period (e.g., the length of time until a beam quality report is created and transmitted). In the illustrated example, two beam sweep periods occur during the beam report period.

FIG. 8 illustrates exemplary BM procedures referred to as P2 and P3. P2 and P3 may be used to select beams for downlink communications. For example, P2 may be used to select transmission beams (e.g., holding the reception beam (s) constant or omnidirectional) and P3 may be used to select reception beams (e.g., holding the transmission beam(s) constant or omnidirectional). P2 and P3 may be on-demand procedures and rely on aperiodic CSI-RS. For example, upon beam degradation (e.g., beam quality metrics falling below a threshold), one or more of P2 or P3 may be used to select new or better transmission and/or reception beams. In some embodiments, P2 and or P3 may follow P1, which may be a longer more intensive procedure, e.g., used initially for determining both transmission and reception beams.

In P2, a BS 102 transmits a series (e.g., a sweep) of Tx beams 702A-D, e.g., narrow beams at different angles using a set of CSI resources 802A-D (CSI resource set or CRS). Note that although four Tx beams are shown, any number of beams (e.g., and corresponding CSI resources) may be used in the sweeping pattern. A specific CSI resource may correspond to each beam, resulting in the total group of beams using a specific CRS. For example, a CRS consisting of four resources may be used for P2, such that a different resource is used for each of four beams. More specifically, Tx beam 702A may use CSI-Resource 802A and so forth. In other words, the CRS may not be repeated, e.g., repetition is off. In the example shown, a receiving UE 106 may use a single, broad receive (e.g., Rx beam 704, which may be an omnidirectional beam) beam during the sweep. Based on reports provided by the UE, the gNB may select a Tx beam. The gNB may then use the selected Tx beam (e.g., 702D) for communication with the UE.

In the exemplary P3 procedure of FIG. 8, in contrast to P2, the UE 106 may perform a sweep of Rx beams 704A-D while the gNB transmits a constant, broad Tx beam 702 (e.g., an omnidirectional beam). In this example, the gNB may use a single CSI resource (e.g., shown as 804A, noting that any CSI resource may be used) during the sweep, e.g., repetition may be on. Thus, in this exemplary embodiment, the CRS may only include a single resource, e.g. CSI-Resource 804A. Based on the measurements (e.g., RSRP) of the Tx beam using the different Rx beams, the UE may select an Rx beam. The UE may report the selected Rx beam (e.g., 704A) to the gNB, although Rx beam selection reporting may not be necessary. The UE may use the selected Rx beam for receiving communications from the gNB.

It will be appreciated that other BM procedures are possible, including at least P1, U1, U2, and U3. As noted above, P1 may include concurrent and/or sequential sweeps of both the gNB (e.g., Tx beam) and UE (e.g., Rx). U1, U2, and U3 may correspond to the P1, P2, and P3 procedures, respectively, except in the uplink direction where the roles may be reversed, e.g., the UE may transmit a Tx beam and the gNB may receive with an Rx beam. Thus, in U2, the UE may sweep across multiple transmission beams and in U3, the gNB may sweep across multiple reception beams. Thus, in some embodiments, procedures P1, P2, and P3 may be associated with downlink transmissions and U1, U2, and U3 may be associated with uplink transmissions.

Figure 9B:
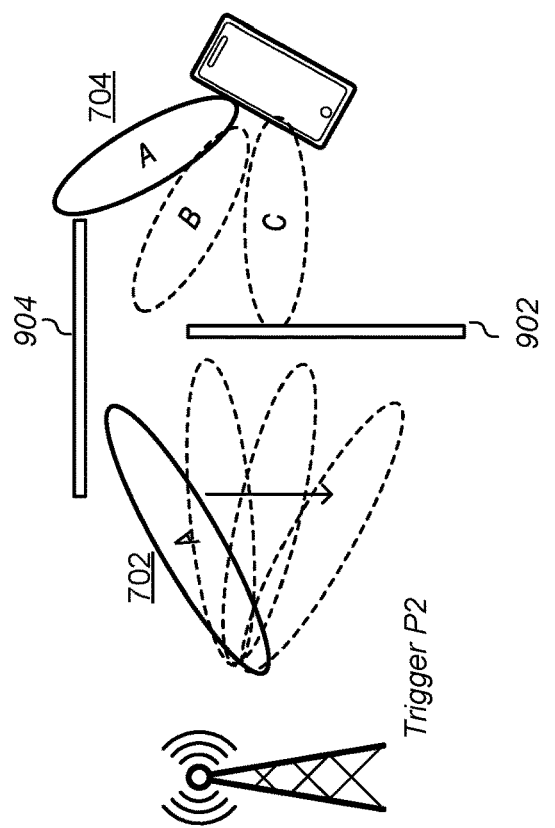
FIGS. 9A and 9B illustrate the effects of motion of a UE on beam selection, according to some embodiments.
Figure 9A:
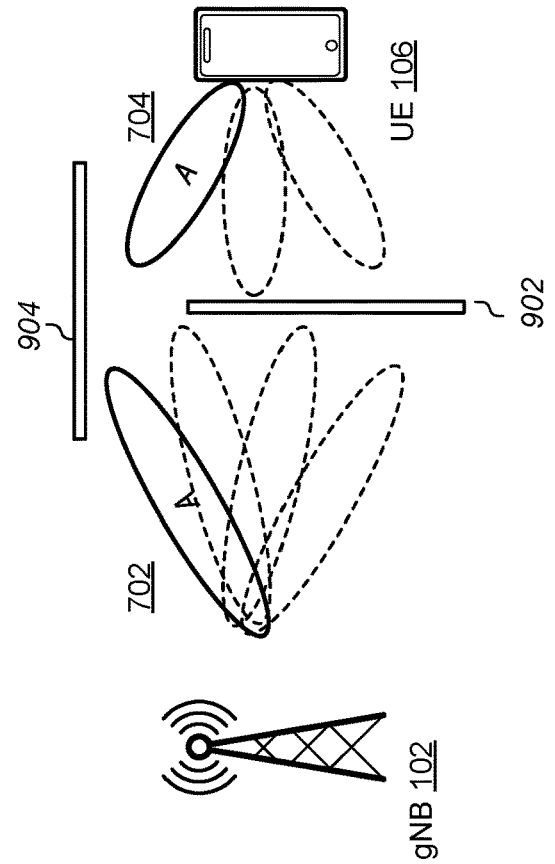

FIGS. 9A and 9B—Implications of UE Motion

FIGS. 9A and 9B illustrate the effects of motion of a UE on beam selection. In FIG. 9A, A UE and a gNB may use a first pair of Tx and Rx beams (e.g., Tx beam 702A and Rx beam 704A) while a UE is in a first location or orientation. The first pair may result in good channel quality (e.g., high RSRP) given the communication environment. As shown, the selected beams may avoid certain obstacles (e.g., 902) and may include reflection from objects (e.g., 904) to achieve a communicative path. FIG. 9B illustrates that the UE may move or rotate (e.g., as the user of the UE moves or handles the phone), and as a result the first pair of Tx and Rx beams may no longer result in good channel quality. The change in the UE's position or orientation relative to the communication environment may lead to degradation of the channel, using the first pair of Tx and Rx beams. Thus, based on the motion of the UE, selection of a new pair of beams may be desirable. If the gNB detects the degradation and is in control of BM procedure selection, it may ignorantly select (e.g., according to trial and error) to trigger a P2 procedure; however, a P3 procedure may be more beneficial in the illustrated scenario.

Various observations may be appreciated. The behavior of a base station (e.g., eNB or gNB) may be predictable to a UE. For example, a gNB may transmit SSB and/or CSI on a known (e.g., periodic) schedule. Changes in a desirable beam (e.g., pair of Tx and Rx beams) may result from changes at the UE, such as movement, rotation, or blockage (e.g., a user's hand or body, or other surrounding objects), etc. For example, in the scenario illustrated in FIG. 9B, rotation of the UE may lead to a change in the preferred Rx beam (e.g., Rx beam 704B may be preferred in the new orientation, or more generally a P3 process may be appropriate to select a new Rx beam). The UE may thus know better than a gNB what actions may be taken to mitigate such changes. For example, the UE may use radio measurements and/or other sensors (e.g., accelerometers, GNSS circuitry) to detect changes that may implicate selection of a new beam pair. The gNB, in contrast, may only be able to detect degradation, and not the factors leading to the degradation. Thus, the UE may be better able to determine the cause of degradation and select an appropriate response. However, current BM approaches may not support signaling/reporting from a UE to assist BM procedures (e.g., to initiate P2 vs P3, among other possibilities). Accordingly, a gNB may rely on trial and error selection of BM procedures, which may incur costs of power, resources, and delay. For example, as noted above, in the case of UE rotation, a gNB may detect RSRP drop (e.g., from a report from the UE) and may trigger P2, although P3 may provide better likelihood of rapidly selecting an appropriate beam pair.

Figure 10:
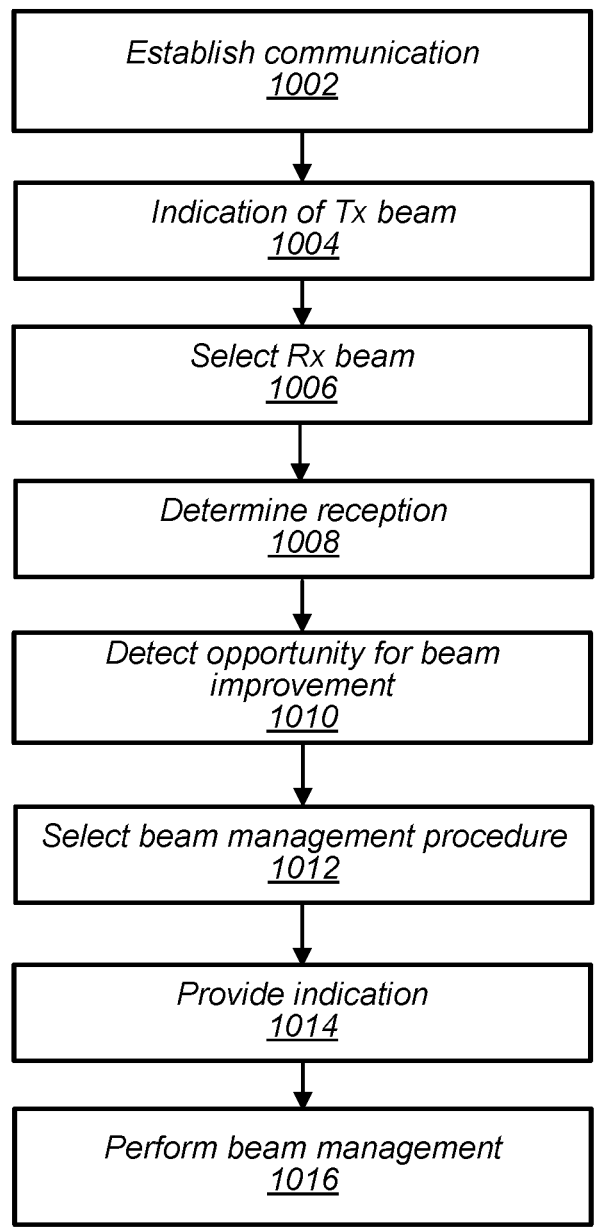
FIG. 10 is a flowchart illustrating techniques for UE initiated beam management procedures, according to some embodiments.

FIG. 10—Flowchart of UE Initiated Beam Management

FIG. 10 illustrates a method for UE initiated beam management procedures, according to some embodiments. As a general (e.g., non-limiting) overview, the method may include: communication between a base station and a UE, detection of degradation of the channel, the UE selecting a preferred beam management procedure, and performing a beam management procedure. The beam management procedure may result in selection of a new beam pair.

In some embodiments, such UE-initiated techniques may compare favorably to other (e.g., gNB-initiated) techniques. In the case of beam-failure, UE initiated techniques may result in reduced delay and reduced overhead. For example, in the case of gNB-initiated procedures, once beam-failure is detected, a gNB may not assume any prior knowledge of beams and may initiate a complete, new BM procedure. Similarly, even though a gNB may receive a report from a UE and detect beam degradation, it may not be able to tell if such degradation is from, for example, a UE's Rx beam or a BS's Tx beam. A blind try (e.g., a BM procedure initiated by the BS) may waste resources, time, and UE power. Further, periodic BM monitoring may be insufficient to respond to rapidly changing conditions.

Aspects of the method of FIG. 10 may be implemented by a wireless device, such as the UEs 106, in communication with a BS 102 as illustrated in and described with respect to FIGS. 1-4, or more generally in conjunction with any of the systems or devices shown in the Figures, among other devices, as desired. Note that while at least some elements of the method of FIG. 10 are described in a manner relating to the use of communication techniques and/or features associated with 3GPP specification documents, such description is not intended to be limiting to the disclosure, and aspects of the method of FIG. 10 may be used in any suitable wireless communication system, as desired. In various embodiments, some of the elements of the methods shown may be performed concurrently, in a different order than shown, may be substituted for by other method elements, or may be omitted. Additional method elements may also be performed as desired. As shown, the method may operate as follows.

In 1002, a UE 106 may establish communication with a BS 102. The UE and BS may exchange control information. Data may also be exchanged. The UE and BS may use any suitable techniques for establishing communication. For example, any Tx and Rx beams may be used. In some embodiments, one or more beam management procedures may be performed to initially determine the Tx and Rx beams, such as P1 and U1, although P2, P3, U2, and/or U3 are also envisioned.

In 1004, the BS may transmit an indication of a Tx beam to the UE and the UE may receive such an indication. The indication may specify which Tx beam the BS is using or intends to use for further transmissions to the UE. For example, after performing the initial beam management procedures, the BS may select a Tx beam (e.g., based on P1 or P2) and provide an indication to the UE of the Tx beam.

The BS may further transmit a request for channel information, e.g., CSI, and may transmit reference signals (e.g., CSI-RS) that the UE may use to determine the channel information. The indication may comprise a transmission configuration indicator (TCI). Alternatively, or additionally, the UE may be expected to perform channel measurement and reporting on a periodic basis, such as shown in FIG. 7 where beam quality reports are provided from the UE based on every two sweeps, in that example.

In 1006, the UE may select an Rx beam for use receiving transmissions from the BS. In other words, the UE may determine its best Rx beam that corresponds to the selected Tx beam, e.g., based on P1 and/or P3. Similar procedures may be used for uplink Tx and Rx beam selection, although unlike the downlink direction, the BS may select the Tx beam of the UE rather than the UE performing that selection.

In 1008, the UE may determine the reception strength and/or quality for one or more (or all) beams in use. For example, the UE may use the selected Rx beam to receive transmissions (e.g., reference signals) transmitted by the BS using the indicated Tx beam. The UE may measure one or more metrics of reception, such as CQI, RSRP, RSRQ, SNR, or SINR, among various possibilities. The UE may transmit the result of the measurement(s) to the BS, e.g., in the form of a CSI, although other reporting mechanisms are envisioned. The transmitted results may be a beam quality report.

According to some embodiments, the UE may continuously or periodically measure the reception of a current beam and one or more other beams. For example, a relatively frequent "active beam pair link measurement" may be applied to the current beam and a set of "K" monitored beam pair links may be monitored with a less frequent "full beam sweep measurement". The "K" monitored beam pair links may be all available beam pairs or may be a subset of available beam pairs. In some embodiments, different subsets may be measured at different time intervals. For example, a selected subset of K beams that are similar to the currently active beam may be monitored at a relatively short interval, and all available beams may be monitored at a less frequent (longer) interval. Such measurements may be performed according to a regular schedule, e.g., at even time intervals, or may be performed as needed. For example, a full beam sweep measurement, e.g., to measure all available beams or a subset of available beams may be performed in response to a result of a measurement of the active beam pair. Measurements of the available beam pairs (including the active beam pair) may be compared, ranked, etc. Similarly, a measurement of the active beam pair, of a subset of available beam pairs, or of all available beam pairs may be performed in response to motion of the device or activity of the user (e.g., initiating an application, etc.). Still further, such measurements may be initiated in response to an indication from a serving BS or from the network.

In 1010, the UE may detect an opportunity for a beam improvement, e.g., based on one or more measurements (e.g., described in 1008) or other trigger conditions. For example, the UE may detect degradation in the channel using a current beam and/or may detect improvement in at least one alternative beam. The UE may compare the measured metric(s) (e.g., metrics of signal strength and quality such as RSRP, RSRQ, SINR, SNR, CQI, etc.) of the current beam to one or more thresholds to assess channel quality. The thresholds may be preconfigured, set by the BS/network, or set by the UE, as desired. For example, the UE may determine that one or more metrics of reception have passed a threshold, e.g., RSRP may fall below a threshold. The UE may also detect an opportunity based on changes in one or more other monitored beams. For example, if one of the K other beams exhibits a higher strength than the current beam, the UE may detect an opportunity for beam improvement. Still further, the UE may determine the rate of change of measurements of the current beam and/or alternative beams and detect an opportunity for beam improvement based on such rates of change (e.g., based on a rapid change in one or more beams). Additionally, or alternatively, the UE may detect an opportunity for beam improvement based on motion (e.g., change of orientation and/or position) of the UE. Some further example trigger conditions include:

Physical downlink shared channel (PDSCH) and/or physical downlink control channel (PDCCH) SNR (either based on the most recent measurement or hypotheses of upcoming measurements) may be below a certain threshold for all DL RSs specified in the current TCI table.

The maximum L1-RSRP (e.g., physical layer RSRP, e.g., RSRP measured at layer 1 or L1) may be smaller than a threshold. In other words, the strongest beam pair link (e.g. serving beam pair link or current beam) may become weaker than a threshold. For example, the threshold may be preconfigured by RRC.

A number of beams with L1-RSRP greater than a first threshold may be smaller than a second threshold. In other words, the number of beams stronger than a strength threshold may be less than a beam-number threshold. For example, this may indicate that the number of beams strong enough to be viable is below the beam-number threshold.

A new beam (e.g., Tx beam and/or Rx beam) may be discovered with L1-RSRP greater than a current strongest beam. For example, there may be a new beam that is stronger than some (or all) of the K monitored beam pair links, or an existing beam may have become stronger than at least some other beams. For example, such a result may indicate that a better beam option may be (or may become) available.

The current beam (e.g., a previously strongest beam) may no longer be the strongest among the set of "K" monitored beam pair links.

All of the K monitored beam pair links may become weaker than a threshold. Such a threshold may be preconfigured by RRC. This potentially may be relatively urgent, e.g., to avoid a potential beam failure.

The Rx (e.g., DL) beam strength may be still good, but no response may be received from a BS (e.g., indicating a problem with the Tx beam). For example, no response to certain types of messages (e.g. SR, PUSCH) may indicate a failure of the UL/Tx beam.

Motion of the UE (e.g., including rotation/change of orientation and/or change of location/position) may be a trigger to initiate a BM procedure.

Triggers may be detected by periodic sweeps or by other measurements (e.g., periodic measurements of the serving beam, as described above in context of 1008).

In 1012, the UE may select a preferred beam management parameter. The beam management parameter may be a beam management procedure, set of reference signals, and/or a related parameter. The beam management procedure and/or parameter may be usable for selection of a new beam pair. In other words, the UE may determine one (or, potentially multiple) beam management procedure from a plurality of possible beam management procedures. For example, the plurality of possible beam management procedures may be or include P1, P2, P3, U1, U2, and U3, among various possibilities. Further, the UE may select one or more related parameters in addition to selecting a beam management procedure.

The UE may use various information to select the preferred procedure including the channel quality information and the output of various sensors of the UE. For example, the UE may consider data from one or more sensors related to its motion and/or orientation, such as gyroscopes, accelerometers, GNSS circuitry, compasses, etc. For example, if a change in the orientation of the UE is approximately coincident with or correlated with a drop in the measured RSRP, the UE may select a BM procedure based on a sweep by the UE, e.g., P3. Alternatively, a UE moving consistently, e.g., such as along a highway, without significantly changing orientation may select a BM procedure based on a sweep by the BS instead of (or in addition to) a sweep by the UE, such as P2 or P1. As another example, if the UE determines that beam degradation has occurred across all measured reception beams (and not only the selected reception beam), the UE may select P2 or P1.

The UE may determine a set of preferred reference signal configurations (e.g., CSI-RS or SRS) for use in beam selection or measurement. For example, a configuration may include one or more of number of resources or ports in the reference signal, periodicity of the reference signal transmission, or number of repetitions of configured reference signals. The reference signals may be associated with one or more transmission and/or reception beams. Thus, the selected reference signals may indicate one or more beams to measure, e.g., to determine a beam offering better performance under current conditions. In other words, the selected reference signals may be used for a beam management procedure (e.g., P1, P2, P3, U1, U2, and U3, etc.) and/or may be used in a custom manner, e.g., to test/measure certain beams.

Additional, related parameters/information may also be selected. The UE may select any of a variety of parameters of the requested BM procedure. Among other possibilities, the UE may select one or more of: a TCI (transmission configuration indicator), number of beams, number of CSI resources, degree of granularity, width or narrowness of beams, a recommended time for the procedure, identity of specifically recommended resources (e.g., in the time and/or frequency domains) for the procedure, etc.

As noted above, a TCI may be selected. The TCI may provide additional detail for selecting a Tx beam or beams to use for a BM, e.g., to include in a sweep. The TCI may help a gNB determine how to aim or refine the beams.

In some embodiments, the UE may select and recommend a specific set of Tx/Rx beams or may recommend a narrowed set of possible beams (e.g., a recommendation to perform a BM procedure sweeping only a few, e.g., most likely, beams). For example, a UE may recommend a specific beam or beams based on its rotation and/or motion. For example, the rotating UE 106 of FIG. 9 may recommend UE 106's beam 704B based on its rotation, and may further recommend continuing to use the BS 102's beam 702A. Alternatively, the rotating UE 106 may recommend a BM procedure testing UE 106's beams 704B and C.

As noted above, in some embodiments, the UE may send to the network (e.g., to the BS) an indication of the required number of resources (e.g., size of the CRS) to perform the indicated BM procedure. This approach may be applied to BM procedures wherein the UE performs a sweep, such as P3, P1, U1, or U3, among other possibilities. The number of resources may be useable by the gNB to guide, narrow, or focus the BM procedure. For example, the number of resources may implicitly indicate that the UE is capable of a hierarchical search approach. As illustrated in FIGS. 14-17 and described in more detail below, a hierarchical search may require fewer resources and less time to complete than a sequential search. Therefore, based at least in part on the indication of the required number of resources, the gNB may recognize that the UE only requires resources (e.g., CSI) for a hierarchical search (e.g., as opposed to a sequential search). The beam refinement process may rely on hierarchical techniques such as those described in more detail below. This may save time and resources for beam selection, benefiting both the network and the UE, which may also save battery power.

In 1014, the UE may provide an indication to the BS of the preferred BM procedure, selected reference signals, and/or related parameters. The selected BM procedure (e.g., which may be explicitly or implicitly indicated to the BS) may be one of P1, P2, P3, U1, U2, or U3. A selected set of reference signals may implicitly (and/or explicitly) indicate a BM procedure. The indication may be transmitted by any suitable method and any suitable format. For example, such information may be carried at least by one of the following: short or long physical uplink control channel (PUCCH), media access layer (MAC) control element (MAC CE) in physical uplink shared channel (PUSCH), or special preambles associated with either contention-based or contention-free random access channel (RACH) messages. Any of various techniques for encoding the indication in such messages may be used, as desired.

In some embodiments, a UE may send information to a gNB to indicate a requested BM procedure, reference signals, and/or related parameters in a PUCCH. The information may be included in a PUCCH in any way. For example, a dedicated PUCCH in a short or long format, e.g., a new PUCCH format may be created for this purpose. Alternatively, a field of N-bits may be included in an existing PUCCH format. The information may be encoded in the PUCCH in any of various ways. For example, in a 4-bit bit-field, each bit may correspond to a preferred BM procedure (e.g., 0010 may correspond to the second BM procedure in a list of four procedures). Alternatively, a 2-bit field that indicates four values, each corresponding to one of four predefined BM procedures may be used (e.g., P2, P3, U2, or U3). Any number of bits may be used to correspond to a selected BM procedure.

According to various embodiments, additional parameter information, such as TCI, may be included in its own field, or may be included in a joint bit-field with a preferable BM procedure. A joint bit field may be a single field used to indicate two or more parameters, e.g., TCI and BM procedure. Note that the number of bits needed to include the parameters may depend on the number and size of the parameters, e.g., the number of bits needed may depend on the size of the TCI. Examples including TCI and/or BM procedure information in a PUCCH are shown in FIGS. 11A-D and described below. Note that techniques similar to those disclosed in FIGS. 11A-D may be applied to additional parameters other than TCI, such as number of resources.

In some embodiments, instead of including the indication information in PUCCH, the UE may transmit the information in a MAC CE or in a RACH preamble. Exemplary methods of including such information in a RACH preamble are illustrated in FIG. 12 and described below.

Upon transmitting such an indication (e.g., in a PUCCH, or any other format), a UE may start a timer during which the UE monitors either aperiodic CSI triggers or Sound Reference Signal Resource Set (SRS) triggers. In some embodiments, the UE may not (e.g., may not be allowed to) request another BM procedure until the timer expires (e.g., the timer may be configured by RRC).

The UE may monitor for a response (e.g., from the BS triggering a BM) either on the regular control resource set (CORESET) as monitoring data or on a dedicated CORESET. Note that if a TCI value is included, the UE may monitor CORESET that is quasi-collocated with the RS indicated by the TCI.

In response to receiving an indication of a preferred BM and any additional parameters, a gNB may trigger a BM procedure in 1016. The BS may trigger the preferred BM procedure and may use any additional parameters indicated.

For example, a UE may send a request for a specified or implied preferable BM procedure according to any of the methods disclosed herein and a gNB may receive the request. If the BM procedure is a downlink procedure, the gNB may trigger CSI reporting on a preconfigured CSI-RS resource set (CRS), where each CRS may correspond to either P2 or P3. Thus, the indicated CRS may trigger the BM procedure. For example, a CRS with four CSI-RS resources may be used for P2 or a CRS with a single CSI-RS resources may be used for P3. In some embodiments, no further explicit signaling may be required. The UE may, in coordination with the gNB, perform the procedure and measure the resulting channel (e.g., according to any metric(s) of strength or quality), and may report the results to the gNB.

If the BM procedure is an uplink procedure, the gNB may signal to the UE whether to apply the same or different Tx beams for an Sound Reference Signal Resource Set (SRS), e.g., as already indicated.

In some embodiments, the BS may not trigger a BM procedure or may trigger a different BM procedure than indicated by the UE.

FIGS. 11A-D—PUCCH Format Examples

FIGS. 11A-D illustrate various mechanisms for including requested BM and/or TCI information in PUCCH. Other formats are possible; in particular formats may be specified for different numbers of BM procedures or to specify different combinations of BM procedure and TCI. Similarly, values and meanings may be arranged differently than shown in the illustrated examples.

FIG. 11A illustrates an exemplary 4-bit field. Each bit of the 4-bit field may correspond to a preferred BM procedure, e.g., a 1 in the Bit 1 place may indicate that the UE prefers/recommends P3 (e.g., the other bits may be zeroes).

FIG. 11B illustrates an exemplary 2-bit field. Each value may correspond to a preferred BM procedure, e.g., "01" may indicate that the UE prefers/recommends P3.

FIG. 11C illustrates an exemplary additional 2-bit field for indicating TCI. TCI may indicate a QCL relationship between downlink reference signals of a set and uplink reference signal ports. A TCI-State IE may associate one or two DL reference signals with a corresponding QCL type. Each value may correspond to a preferred/recommended TCI for use with an indicated BM procedure, e.g., "01" may indicate TCI 1. For example, TCI 0 may imply P1 procedure, TCI 1 may imply P2 procedure, TCI 2 may imply P3 procedure and TCI 3 may imply that the UE does not have any preference of a possible procedure. In general, any combinations of {P1, P2, P3} and {U1, U2, U3} may be associated with one (or potentially more) of the TCI states.

FIG. 11D illustrates an exemplary 2-bit field for indicating both a BM procedure and TCI. Each value may correspond to a preferred BM procedure and TCI, e.g., "01" may indicate P3 and TCI 1. Thus, in the joint field of 11D each bit value may be overloaded and indicate both the desired BM procedure as well as TCI value.

FIG. 12—RACH Preamble Examples

FIG. 12 illustrates various mechanisms for including requested BM and/or additional parameters (e.g., TCI information, number of resources, etc.) in a RACH preamble. These techniques may rely on Zadoff-Chu (ZC) sequences. The parameters of the ZC sequence may be varied to create different preambles which are all orthogonal. FIG. 12 is a table illustrating these parameters. For example, two orthogonal RACH preambles may have the same v (e.g., cyclic shifts of the random access preamble) but different u (e.g., ZC sequence index), or different v but the same u.

A UE may be configured with a set of special preambles, where each of them is associated with a unique UE ID and an implication of one or more desired BM procedures. An association between preamble and a recommended BM procedure may be indicated by u, v or Ncs; for example, each respective one of the predefined set of values may be used to indicate a respective BM procedure.

Transmission of such a special preamble may be either on a contention-based or contention-free RACH. For example, a UE may transmit on a RACH corresponding to an SSB quasi-collocated with the CSI-RS that the UE wants to use to refine the beam. Alternatively, a UE may transmit on the first available and viable RACH resource.

FIG. 13—Mapping Rule and Trigger Conditions

In some embodiments, the UE 106 may map a set of measurements (e.g., radio measurements and/or sensor measurements) to the desired BM procedure or operations (e.g., including additional parameters). The UE may not send a request or report without any conditions, e.g., measurements that suggest that a BM is needed. In order to inform the BS 102 (e.g., gNB, which may accordingly decide how to move forward, e.g., with a specific BM procedure) the UE may encapsulate or map the details of a measurement into an indication or implication (e.g., a bit field) indicating a desired operation. In order to quickly deliver the indication (e.g., in a PUCCH, preamble, or MAC CE), the size of the message (e.g., number of bits) may be limited and the message may not carry much information. Note that reports through RRC may carry more bits, but may not be suitable for BM selection due to the length of time involved. Further, some conditions (e.g., output from a motion sensor) may be relevant to BM, but may not be included in technical specifications. Thus, similar to a CSI report, the UE may make a selection/prediction of what BM operation including related parameters is best and relay this prediction to the BS or gNB. FIG. 13 shows an exemplary mapping table. The table shows a UE preference for P2 vs P3 in a 2-bit field, and lists example conditions that may lead to each preference. Numerous additional trigger conditions, and corresponding mappings, are also envisioned. The relation between trigger conditions and BM (and/or other parameters) may be configured as desired.

Figures Illustrating Sequential and Hierarchical Receiver Beam Sweeping

Figure 14:
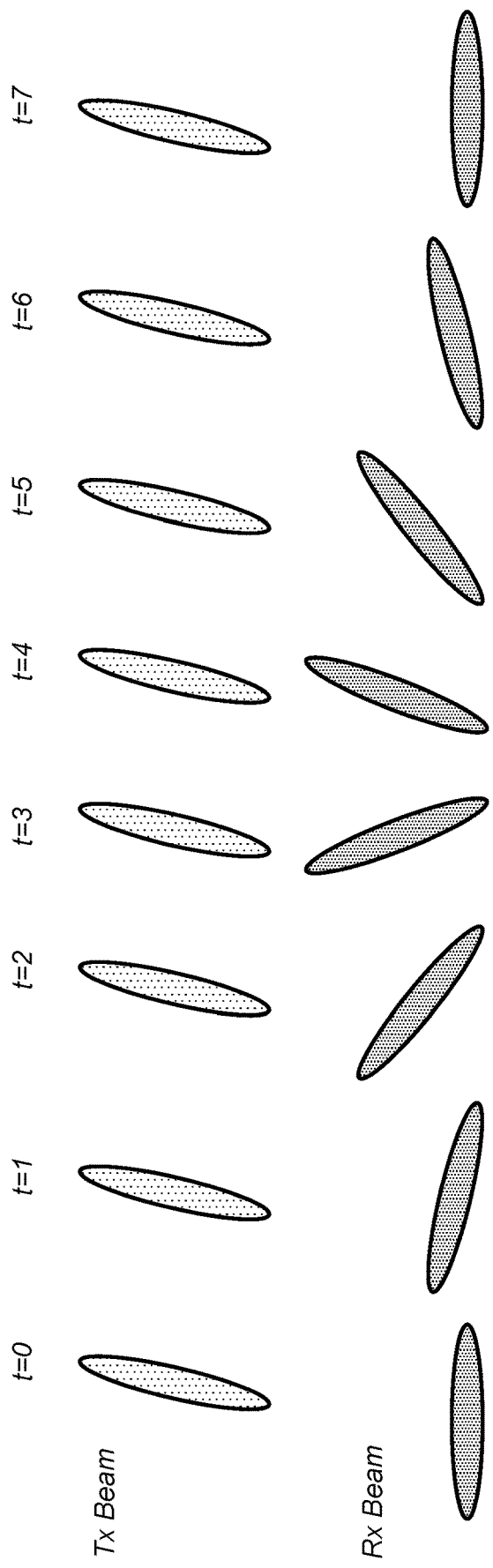

FIG. 14 illustrates various Tx and Rx beams. In sequential Rx (or Tx, e.g., a Tx beam sweep process may be similar or symmetric to the illustrated Rx process) beam sweeping, the Rx beam may proceed through several different orientations while the Tx (or Rx) beam remains constant. In this approach, the amount of resources (e.g., # of OFDM symbols) and time may linearly increase as the number of Rx (or Tx) beams to sweep increases. As illustrated, over 8 time periods (e.g., t=0 to t=7), the Tx beam may remain constant while the Rx beam may sequentially "sweep" through various directions. Thus, over the course of the 8 time periods, 8 OFDM symbols may be used and 8 Rx beams may be "swept", e.g., tested.

Figure 15:
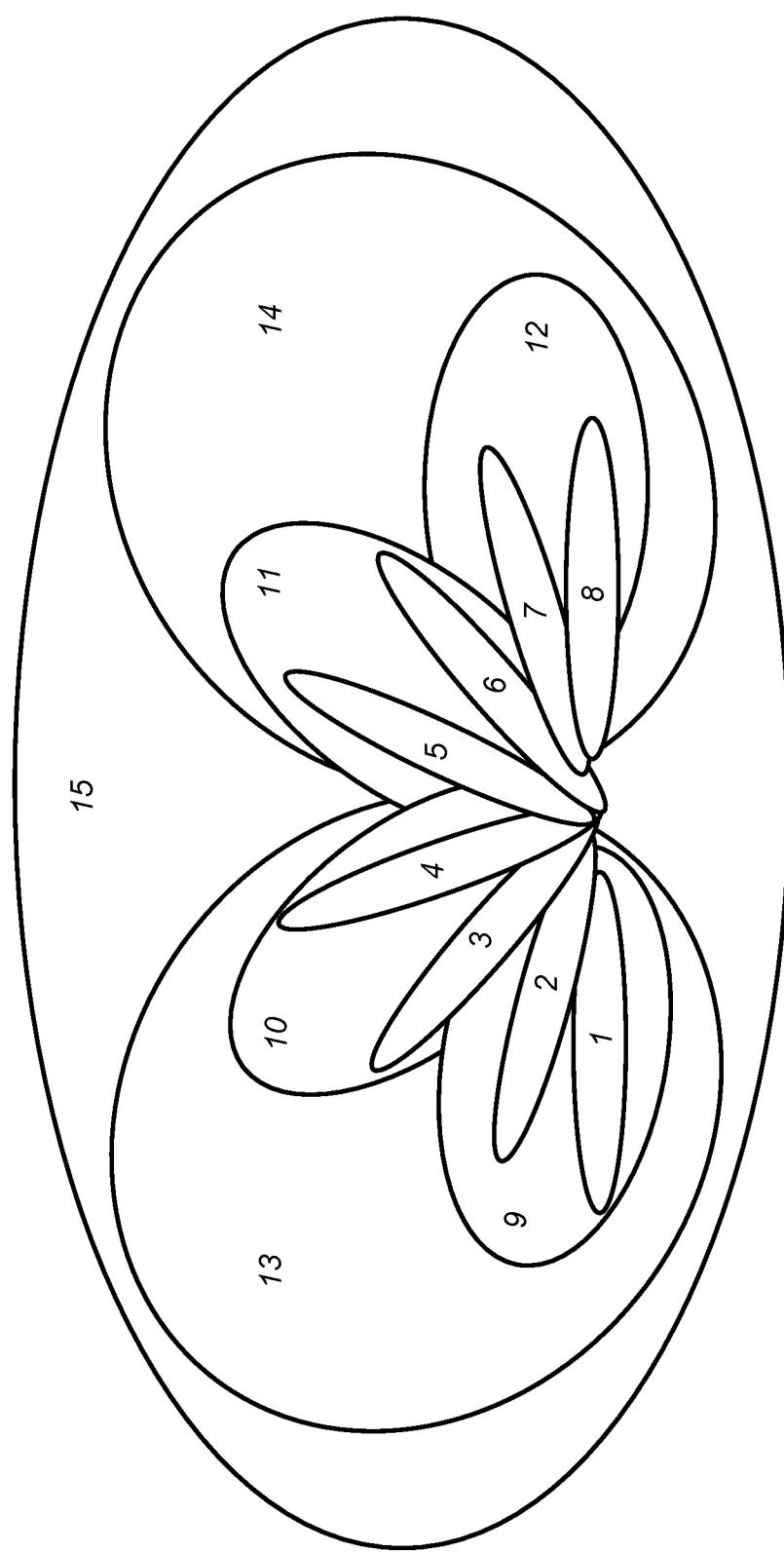

FIG. 15 illustrates 15 Rx beams, showing a hierarchical structure (e.g., a beam tree). A hierarchical structure may allow the Rx beam searching time and amount of resources to be reduced significantly. In other words, the time and resource requirements of a hierarchical search approach may increase logarithmically as a function of the number of Rx beams, in contrast to the linear increase described above with respect to FIG. 14 and a sequential search. As will be appreciated, other hierarchical structures and other numbers of beams are possible and may be configured as desired. As shown, beams 1-8 are level 1 beams. The level 1 beams may be considered narrow or focused beams, and may offer better reception than the higher-level beams, e.g., after a level 1 beam that is appropriate to the conditions is identified. Beams 9-12 are level 2 "wide beams" where each wide beam covers 2 level 1 beams (e.g., 9 approximately covers 1 and 2). Beams 13 and 14 are level 3 beams and beam 15 is omni-directional (e.g., level 4). Note that a level may cover two or more beams in a lower level, e.g., depending on the construction of beams (or beam tree). In other words, each node may have different numbers of child nodes, depending on the beam tree design or construction method. Beam tree design may be configured as desired.

The goal of a hierarchical sweep may be to find a level 1 beam that offers high (e.g., the best) level of reception (e.g., RSRP, RSRQ, SNR, etc.).

Figure 16:
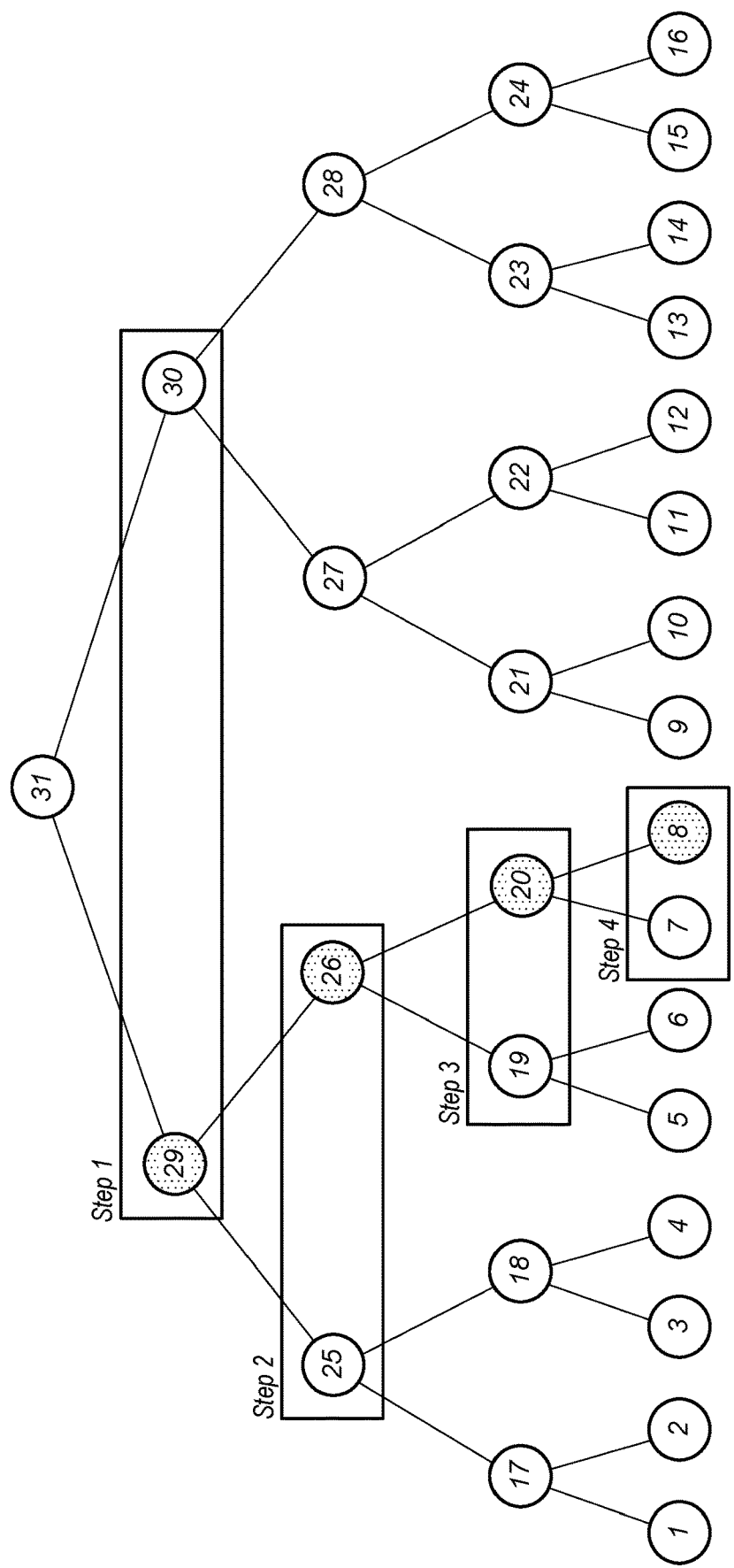

FIG. 16 illustrates an exemplary hierarchical search process with 16 level 1 Rx beams (e.g., beams 1-16), 8 level 2 beams (17-24), 4 level 3 beams (25-28), two level 4 beams (29-30), and a single level 5 beam, e.g., beam 31 which may be omni-directional. Thus there are 31 total Rx beams in the illustrated example.

To perform the search, only two beams may be compared at each level (e.g., based on strength, quality, interference, etc.). The four levels (e.g., it may be appropriate to test levels 1-4, and level 5 may be skipped) may result in 2*4=8 total Rx beam switchings (e.g., switches, changes), in comparison to a sequential search which may require 16 beam switches (e.g., sequentially testing each of the level 1 beams 1-16). Step 1 may compare beams 29 and 30 (e.g., level 4), selecting beam 29. Step 2 may compare beams 25 and 26 (e.g., level 3), selecting beam 26. Step 3 may compare beams 19 and 20 (e.g., level 2), selecting beam 20. Step 4 may compare beams 7 and 8, selecting beam 8 as the preferred level 1 beam.

Note that similar techniques (e.g., using hierarchical sweeps) may be applied to select Tx beams. For example, although FIGS. 15 and 16 have been described above in terms of Rx beams, Tx beams may exhibit similar relationships, e.g., spatially and in terms of hierarchical structure. Accordingly, similar hierarchical search processes may be applied to Tx beams. Still further, a combined Tx and Rx search process may use such hierarchical techniques.

FIG. 17 illustrates a summary comparison of sequential and hierarchical Rx beam search. If the number of beams X is $2^N$, where N is the number of levels, then a sequential search may require $2^N$ beam sweeps (e.g., switches) and correspondingly $2^N$ OFDM symbols. Hierarchical binary sweeping may require $2*\log_2(X)=2*N$ sweeps and symbols. For example, in the case of 32 Rx beams ($X=32=2^N$), $N=5$. Thus 32 ($=2^5$) switches are required for a sequential search while only 10 ($=2*5$) are required for a hierarchical search. The number of beams to sweep may depend on beam tree design. For example, in ternary beam sweeping (e.g., each node in a beam tree has three child nodes) the total number of beams may be given as $2*\log_3(X)$.

Further Examples

In the following, exemplary embodiments are provided.

In one set of embodiments, a method for performing beam management, may comprise a user equipment (UE) device: establishing wireless communication with a base station; receiving an indication of a transmission beam of the base station used for communication with the UE device; determining a reception beam of the UE device used for communication with the base station based at least on the indication of the transmission beam; detecting degradation of wireless communication between the base station and the UE using at least the transmission beam of the base station and the reception beam of the UE device; determining a beam management procedure based on said detecting the degradation of the communication between the base station and the UE; providing an indication of the beam management procedure to the base station; and performing the beam management procedure.

In some embodiments, said determining the beam management procedure may comprise determining a number of channel state information (CSI) resources for performing the beam management procedure, wherein said providing the indication comprises providing an indication of the number of CSI resources, and wherein performing the beam management procedure uses the number of CSI resources.

In some embodiments, said determining the beam management procedure may further comprise determining a number of receive beams for performing the beam management procedure, wherein said providing the indication comprises providing an indication of the number of receive beams, and wherein performing the beam management procedure uses the number of receive beams.

In some embodiments, said determining the beam management procedure may comprise determining a number of sounding reference signal (SRS) resources for performing the beam management procedure, wherein said providing the indication comprises providing an indication of the number of CSI resources, and wherein performing the beam management procedure uses the number of CSI resources.

In some embodiments, said determining the beam management procedure may comprise determining a number of transmission beams for performing the beam management procedure, wherein said providing the indication comprises providing an indication of the number of transmission beams, and wherein performing the beam management procedure uses the number of transmission beams.

In some embodiments, the method may further comprise: determining a transmission configuration indicator based on said detecting the degradation of the communication between the base station and the UE; and providing an indication of the transmission configuration indicator to the base station.

In some embodiments, said detecting degradation may comprise determining that one or more trigger conditions is satisfied.

In some embodiments, the one or more trigger conditions may comprise one or more of: reference signal received power is less than a threshold; channel quality indicator is less than a threshold; or signal-to-noise ratio is less than a threshold.

In some embodiments, the method may further comprise: detecting motion of the UE device, wherein said determining the beam management procedure is based at least in part on the motion of the UE device.

In some embodiments, the motion of the UE device may comprise rotation of the device.

In some embodiments, the motion of the UE device may comprise a change in the location of the device.

In some embodiments, the beam management procedure may comprise one of P2, P3, U2, or U3.

In some embodiments, said providing an indication of the beam management procedure to the base station may comprise transmitting a physical uplink control channel (PUCCH) message.

In some embodiments, said providing an indication of the beam management procedure to the base station may comprise transmitting a media access layer (MAC) control element (MAC CE) in a physical uplink shared channel (PUSCH) message.

In some embodiments, said providing an indication of the beam management procedure to the base station comprises transmitting a preamble to a random access channel (RACH) message.

A further set of embodiments may comprise a user equipment device, comprising: at least two antennas; at least one radio coupled to the antennas; and a processing element coupled to the radio; wherein the device is configured to: communicate with a base station using a first beam; detect an opportunity for beam improvement; select a beam management parameter; and provide an indication of the beam management parameter to the base station.

Another exemplary embodiment may include a wireless device, comprising: an antenna; a radio coupled to the antenna; and a processing element operably coupled to the radio, wherein the device is configured to implement any or all parts of the preceding examples.

A further exemplary set of embodiments may include a non-transitory computer accessible memory medium comprising program instructions which, when executed at a device, cause the device to implement any or all parts of any of the preceding examples.

A still further exemplary set of embodiments may include a computer program comprising instructions for performing any or all parts of any of the preceding examples.

Yet another exemplary set of embodiments may include an apparatus comprising means for performing any or all of the elements of any of the preceding examples.

Yet another exemplary set of embodiments may include a 5G NR network node or base station configured to perform any action or combination of actions as substantially described herein in the Detailed Description and/or Figures.

Yet another exemplary set of embodiments may include a 5G NR network node or base station that includes any component or combination of components as described herein in the Detailed Description and/or Figures as included in a mobile device.

Embodiments of the present disclosure may be realized in any of various forms. For example, some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of the method embodiments described herein, or, any combination of the method embodiments described herein, or, any subset of any of the method embodiments described herein, or, any combination of such subsets.

In some embodiments, a device (e.g., a UE 106) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method for performing beam management, comprising:

by a base station:
establishing wireless communication with a user equipment device (UE);
transmitting, to the UE, an indication of a transmission beam of the base station used for communication with the UE;
transmitting, to the UE, a reference signal using the transmission beam;
receiving, from the UE, an indication of a preferred beam management procedure of a plurality of possible beam management procedures; and
performing a beam management procedure with the UE according to the indication of the preferred beam management procedure.

2. The method of claim 1, wherein the indication of the preferred beam management procedure includes an indication of a number of resources, and wherein performing the beam management procedure uses the number of resources.

3. The method of claim 2, wherein the indication of the preferred beam management procedure includes a number of beams for performing the beam management procedure and wherein performing the beam management procedure uses the number of beams.

4. The method of claim 3, wherein the number of beams is equal to the number of resources.

5. The method of claim 3, wherein the number of beams is a number of receive beams, wherein the number of resources is a number of channel state information resources.

6. The method of claim 3, wherein the number of beams is a number of transmission beams, wherein the number of resources is a number of sounding reference signal resources.

7. The method of claim 2, wherein the number of resources indicates that the UE is capable of a hierarchical search process.

8. The method of claim 1, wherein the indication of the preferred beam management procedure includes a transmission configuration indicator.

9. An apparatus for managing a base station, the apparatus comprising:
a processor configured to cause the base station to:
communicate with a user equipment device (UE);
transmit, to the UE, an indication of a transmission beam;
transmit, to the UE, a reference signal using the transmission beam;
receive, from the UE, an indication of a preferred beam management procedure of a plurality of possible beam management procedures; and
perform a beam management procedure according to the indication of a preferred beam management procedure.

10. The apparatus of claim 9, wherein the indication of the beam management procedure includes a transmission configuration indicator.

11. The apparatus of claim 9, wherein the indication of the beam management procedure includes a media access layer (MAC) control element (MAC CE).

12. The apparatus of claim 9, wherein the indication of the beam management procedure includes a physical uplink control channel (PUCCH) message.

13. The apparatus of claim 9,
wherein to communicate with the UE comprises using a first beam pair,
wherein the apparatus is further configured to cause the UE to perform periodic measurements of at least the first beam pair.

14. The apparatus of claim 13,
wherein the apparatus is further configured to cause the UE to perform periodic measurements of at least one additional beam pair,
wherein the beam management procedure is based on a comparison of measurements of the first beam pair to measurements of the at least one additional beam pair.

15. A base station, comprising:
at least two antennas;
at least one radio coupled to the antennas; and
a processor coupled to the radio;
wherein the processor is configured to cause the base station to:
communicate with a user equipment device (UE) using a first beam;
transmit, to the UE, an indication of the first beam;
receive, from the UE, an indication of a preferred beam management procedure of a plurality of possible beam management procedures; and
perform a beam management procedure according to the indication of a preferred beam management procedure.

16. The base station of claim 15, wherein the indication of the preferred beam management procedure includes a media access layer (MAC) control element (MAC CE) in a physical uplink shared channel (PUSCH) message.

17. The base station of claim 15, wherein the indication of the preferred beam management procedure includes a preamble to a random access channel (RACH) message.

18. The base station of claim 17, wherein a preamble of the RACH message includes a Zadoff-Chu sequence, wherein the Zadoff-Chu sequence indicates the preferred beam management procedure.

19. The base station of claim 15, wherein the indication of the preferred beam management procedure includes a transmission configuration indicator.

20. The base station of claim 15, wherein the indication of the first beam includes a transmission configuration indicator.

* * * * *